(12) United States Patent
Yamada

(10) Patent No.: US 11,273,628 B2
(45) Date of Patent: *Mar. 15, 2022

(54) ENDLESS BELT, IMAGE-FORMING APPARATUS, ENDLESS BELT UNIT, AND POLYIMIDE RESIN MOLDED PRODUCT

(71) Applicant: FUJIFILM Business Innovation Corp., Tokyo (JP)

(72) Inventor: Wataru Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 296 days.

This patent is subject to a terminal disclaimer.

(21) Appl. No.: 15/915,729

(22) Filed: Mar. 8, 2018

(65) Prior Publication Data

US 2019/0072881 A1 Mar. 7, 2019

(30) Foreign Application Priority Data

Sep. 1, 2017 (JP) .............................. JP2017-168576

(51) Int. Cl.
*B32B 27/28* (2006.01)
*G03G 15/16* (2006.01)
*B32B 27/24* (2006.01)

(52) U.S. Cl.
CPC ............ *B32B 27/281* (2013.01); *B32B 27/24* (2013.01); *G03G 15/162* (2013.01); *G03G 15/1685* (2013.01); *B32B 2264/108* (2013.01); *B32B 2307/202* (2013.01); *B32B 2413/00* (2013.01)

(58) Field of Classification Search
CPC . B32B 27/281; B32B 27/24; B32B 2264/108; B32B 2307/202; B32B 2413/00; G03G 15/1685; G03G 15/162; C08G 73/1007; C08G 73/1071
See application file for complete search history.

(56) References Cited

U.S. PATENT DOCUMENTS

| 4,923,763 A * | 5/1990 | Nakamura ......... G11B 5/73937 428/458 |
| 5,621,512 A | 4/1997 | Uehara et al. |
| 6,303,054 B1 * | 10/2001 | Kanetake ................. H01B 1/24 252/511 |

(Continued)

FOREIGN PATENT DOCUMENTS

| CN | 101522808 A | 9/2009 |
| JP | 5-200904 A | 8/1993 |

(Continued)

OTHER PUBLICATIONS

Machine translation of JP 2004-224994. (Year: 2004).*
Office Action dated Oct. 11, 2021 in Chinese Application No. 201810424958.1.

*Primary Examiner* — John D Freeman
(74) *Attorney, Agent, or Firm* — Sughrue Mion, PLLC

(57) ABSTRACT

An endless belt includes a polyimide resin layer containing a polyimide resin containing two or more components derived from tetracarboxylic dianhydrides and/or two or more components derived from diamine compounds; and at least one solvent selected from a solvent group A consisting of urea-based solvents, alkoxy-group-containing amide-based solvents, and ester-group-containing amide-based solvents in an amount of from about 50 ppm to about 2,000 ppm.

18 Claims, 6 Drawing Sheets

(56) References Cited

U.S. PATENT DOCUMENTS

| | | | |
|---|---|---|---|
| 9,229,375 B2 | 1/2016 | Kubo et al. | |
| 9,857,735 B1* | 1/2018 | Yamada | G03G 15/2057 |
| 2002/0141784 A1* | 10/2002 | Kusayanagi | B29C 39/028 |
| | | | 399/179 |
| 2008/0044684 A1* | 2/2008 | Chan | B29B 17/0042 |
| | | | 428/626 |
| 2010/0055365 A1* | 3/2010 | Nakajima | B29C 41/085 |
| | | | 428/36.9 |
| 2013/0327982 A1* | 12/2013 | Nakayama | C08G 73/1042 |
| | | | 252/182.28 |
| 2014/0248069 A1* | 9/2014 | Kubo | G03G 15/162 |
| | | | 399/302 |
| 2017/0363991 A1* | 12/2017 | Yamada | G03G 15/2057 |

FOREIGN PATENT DOCUMENTS

| | | | |
|---|---|---|---|
| JP | 6-149083 A | | 5/1994 |
| JP | 6-228335 A | | 8/1994 |
| JP | 3298354 B2 | | 7/2002 |
| JP | 2004224994 A | * | 8/2004 |
| JP | 2010-066430 A | | 3/2010 |
| JP | 2014-170048 A | | 9/2014 |

\* cited by examiner

ENDLESS BELT, IMAGE-FORMING APPARATUS, ENDLESS BELT UNIT, AND POLYIMIDE RESIN MOLDED PRODUCT

CROSS-REFERENCE TO RELATED APPLICATIONS

This application is based on and claims priority under 35 USC 119 from Japanese Patent Application No. 2017-168576 filed Sep. 1, 2017.

BACKGROUND

(i) Technical Field

The present invention relates to endless belts, image-forming apparatuses, endless belt units, and polyimide resin molded products.

(ii) Related Art

Electrophotographic image-forming apparatuses form a charge on a photoreceptor, form an electrostatic charge image based on modulated image signals, for example, using laser light, and then develop the electrostatic charge image with a charged toner to form a toner image. The toner image is then transferred to a recording medium such as paper, either directly or via an intermediate transfer member, and is fixed to the recording medium to obtain an image.

Here, there are known image-forming apparatuses that employ a so-called intermediate transfer system, i.e., a system that performs first transfer of a toner image on a photoreceptor to an intermediate transfer member and then performs second transfer of the toner image on the intermediate transfer member to a recording medium such as paper. As intermediate transfer members for use in such image-forming apparatuses, endless belts containing thermoplastic resins such as polyvinylidene fluoride and polycarbonate and conductive materials such as carbon black have been proposed.

Endless belts formed of heat-resistant resins are also used in fixing devices that fix images to recording media. As fixing devices, there are known fixing devices including a heating fixing roller with which a fixing belt is disposed in contact so as to form a contact surface and that heat and fix an unfixed toner image as a sheet passes between the heating fixing roller and the fixing belt.

Endless belts are also used as transport belts for transportation of items such as recording media.

Here, materials for endless belts used as intermediate transfer belts, fixing belts, and transport belts require properties such as mechanical strength and heat resistance. Since polyimide resins have superior properties such as high mechanical strength and heat resistance, polyimide resins, which have high mechanical strength and heat resistance, are suitable as materials used for such belts.

Endless belts are often used under tension around multiple rollers. For example, such endless belts may meander (walk) during use and may thus break after repeated use in this state.

SUMMARY

According to an aspect of the invention, there is provided an endless belt including a polyimide resin layer containing a polyimide resin containing two or more components derived from tetracarboxylic dianhydrides and/or two or more components derived from diamine compounds; and at least one solvent selected from a solvent group A consisting of urea-based solvents, alkoxy-group-containing amide-based solvents, and ester-group-containing amide-based solvents in an amount of from about 50 ppm to about 2,000 ppm.

BRIEF DESCRIPTION OF THE DRAWINGS

Exemplary embodiments of the present invention will be described in detail based on the following figures, wherein.

DETAILED DESCRIPTION

Figure 1:
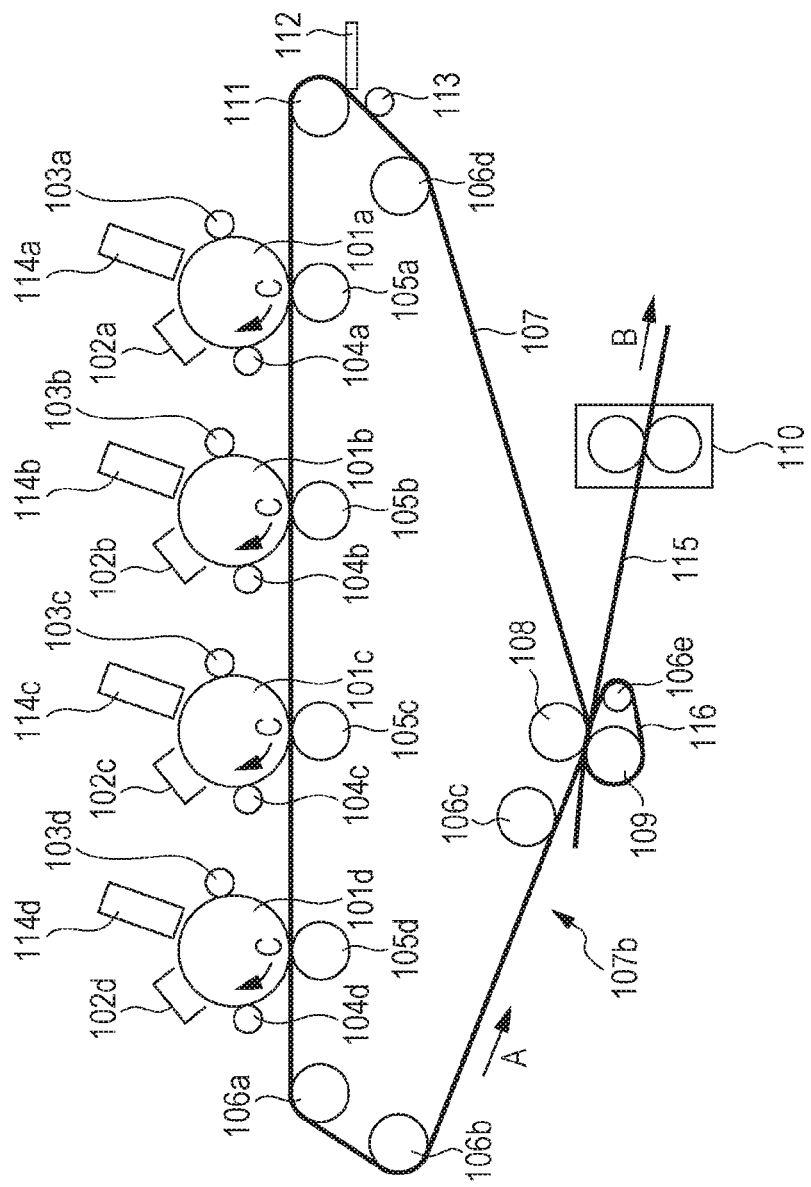
FIG. 1 is a schematic configuration view showing an example of an image-forming apparatus according to an exemplary embodiment.

An exemplary embodiment serving as an example of the present invention will hereinafter be described in detail.
Endless Belt An endless belt according to this exemplary embodiment includes a polyimide resin layer containing the following polyimide resin and at least one solvent selected from the following solvent group A.

Specifically, the endless belt according to this exemplary embodiment includes a polyimide resin layer containing a polyimide resin containing two or more components derived from tetracarboxylic dianhydrides and/or two or more components derived from diamine compounds; and at least one solvent selected from a solvent group A consisting of urea-based solvents, alkoxy-group-containing amide-based solvents, and ester-group-containing amide-based solvents in an amount of from 50 ppm to 2,000 ppm or from about 50 ppm to about 2,000 ppm.

As used herein, "polyimide resin containing two or more components derived from tetracarboxylic dianhydrides and/or two or more components derived from diamine compounds" is a concept including the following polyimide resins.

As used herein, for the sake of convenience, a polyimide precursor obtained by polymerization using one tetracarboxylic dianhydride and one diamine compound is referred to as "homopolymer", whereas a polyimide precursor obtained by polymerization using two or more components derived from tetracarboxylic dianhydrides and/or two or more components derived from diamine compounds is referred to as "copolymer".

1) A polyimide resin obtained from a polyimide precursor that is a copolymer containing two or more different types of structural units derived from tetracarboxylic dianhydrides and/or two or more different types of structural units derived from diamine compounds.

2) A polyimide resin obtained from a mixture of a polyimide precursor that is a first homopolymer containing one type of structural unit derived from a tetracarboxylic dianhydride and one type of structural unit derived from a diamine compound and a polyimide precursor that is a second homopolymer containing a different type of structural unit derived from a tetracarboxylic dianhydride and/or a different type of structural unit derived from a diamine compound.

3) A polyimide resin obtained from a mixture of a polyimide precursor that is a first copolymer of 1) above and a polyimide precursor that is a second copolymer containing a different type of structural unit from the copolymer of 1) above.

4) A polyimide resin obtained from a mixture of a polyimide precursor that is a copolymer of 1) above and a polyimide precursor that is a homopolymer containing a different type of structural unit from the copolymer of 1) above.

In the following description, components derived from tetracarboxylic dianhydrides may be referred to as structural units derived from tetracarboxylic dianhydrides, whereas components derived from diamine compounds may be referred to as structural units derived from diamine compounds.

Polyimide resins are used in a variety of fields because of their properties. For example, polyimide resins are used as materials for endless belts. Endless belts formed of polyimide resins are also used in electrophotographic image-forming apparatuses. For example, endless belts used in electrophotographic image-forming apparatuses are used as endless belts such as transfer belts (including intermediate transfer belts) for transfer devices (an example of a transfer section), transport belts for transport devices for recording media such as a sheet (an example of a recording medium), and fixing belts (e.g., as at least one of a heating belt and a pressing belt) for fixing devices (an example of a fixing section).

For example, endless belts are often used under tension around multiple rollers. Depending on the use environment, such endless belts are subjected to, for example, a mechanical load (mechanical stress) or thermal load (thermal stress) such as friction with another member. For example, such endless belts may meander (walk) during use and may thus break after repeated use in a meandering state.

Endless belts used in image-forming apparatuses are also often used under tension around multiple rollers. When an endless belt used in an image-forming apparatus is used under tension around multiple rollers, the endless belt is subjected to, for example, a mechanical load or thermal load such as friction with another member such as a limiting member. In addition, depending on factors such as mismatch with the settings of the machine equipped with the endless belt and the levelness of the installation site, the endless belt may meander and thus experience mechanical and thermal stresses, for example, as its end comes into contact with another member such as a limiting member. As a result, such endless belts used in image-forming apparatuses may break after repeated use in a meandering state.

Accordingly, for example, one of the properties required for endless belts used in image-forming apparatuses is a reduced susceptibility to breakage after repeated use in an environment as described above.

In contrast, the endless belt according to this exemplary embodiment, having the configuration described above, may have a reduced susceptibility to breakage upon meandering. Although the reason remains unclear, it is presumed to be as follows.

A polyimide resin is obtained by heating a polyimide precursor composition to cause imidization. During the imidization process, the solvent in which the polyimide precursor is dissolved volatilizes. During this process, an interaction occurs between the polar groups of the polyimide precursor and the polar groups of the solvent of the solvent group A. The molecular chains of the polyimide resin and the molecules of the solvent of the solvent group A are believed to form a stacking (stacked) structure in the resulting polyimide resin. If the polyimide resin contains too small an amount of the solvent of the solvent group A, less interaction occurs between the polar groups of the solvent of the solvent group A and the polar groups of the polyimide resin. On the other hand, if the polyimide resin contains too large an amount of the solvent of the solvent group A, there are larger distances between the molecular chains of the polyimide resin.

Thus, if the polyimide resin contains the solvent of the solvent group A in an amount within the above range, the polyimide resin has a stable stacking structure between the molecular chains of the polyimide resin and the molecules of the solvent of the solvent group A.

Here, a stronger interaction is believed to occur between the polar groups of the solvent of the solvent group A and the polar groups of the polyimide resin than between the polar groups of a conventionally used solvent (e.g., N-methylpyrrolidone, N,N-dimethylacetamide, or γ-butyrolactone) present in a polyimide resin and the polar groups of the polyimide resin. Therefore, the stacking structure formed by the molecular chains of the polyimide resin and the molecules of the solvent of the solvent group A is believed to be more stable than the stacking structure of a polyimide resin containing a conventional solvent.

Thus, the polyimide resin containing the solvent of the solvent group A is believed to have a more stable stacking structure between the molecular chains of the polyimide resin and the molecules of the solvent of the solvent group A.

In addition, since the interaction in the polyimide resin containing the solvent of the solvent group A in an amount within the above range is stronger than the interaction between the polar groups of a conventional solvent and the polar groups of a polyimide resin, as described above, the polyimide resin is believed to have increased flexibility.

As described above, these effects are believed to be achieved since the polyimide resin layer forming the endless belt according to this exemplary embodiment contains the solvent of the solvent group A in an amount within the above range.

On the other hand, for example, the durability of a polyimide resin may be improved by controlling multiple physical properties such as the toughness (film toughness) and hardness of the polyimide resin. The physical properties of a polyimide resin may be changed depending on, for example, the types of components forming the polyimide precursor. Furthermore, as described above, as the solvent in which the polyimide precursor is dissolved volatilizes during the imidization process, polyimide molecules are stacked on top of each other while the imidization reaction proceeds. The physical properties of the polyimide resin may also be changed depending on the stacking state. The polyimide resin layer of the endless belt according to this exemplary embodiment contains a polyimide resin containing two or more components derived from tetracarboxylic dianhydrides and/or two or more components derived from diamine compounds. This is believed to improve the durability of the polyimide resin. In addition, since the polyimide resin layer contains a polyimide resin containing two or more components derived from tetracarboxylic dianhydrides and/or two or more components derived from diamine compounds and a solvent of the solvent group A in an amount within the above range, a more appropriate stacking state is believed to be achieved.

Although the reason remains unclear, it is presumed to be as follows. If a polyimide resin is composed only of units having the same structure, the stacking of the units, typically aromatic units, provides a hard film. However, there is a large difference in strength between portions containing more aromatic units and portions containing fewer aromatic units, and the film would break on minor occasions. In contrast, the presence of two or more tetracarboxylic dianhydrides or two or more diamine compounds is believed to slightly reduce the stacking of the aromatic units on top of each other and thus allow the entry of the solvent of the solvent group A between the molecules, thereby imparting moderate flexibility to the film and thus reducing the susceptibility to breakage.

As a result, the endless belt according to this exemplary embodiment may have a reduced susceptibility to breakage upon meandering.

For urea-based solvents, urea groups correspond to the polar groups of the solvent of the solvent group A. For alkoxy-group-containing amide-based solvents, alkoxy groups and amide groups correspond to the polar groups of the solvent of the solvent group A. For ester-group-containing amide-based solvents, ester groups and amide groups correspond to the polar groups of the solvent of the solvent group A. In addition, amide groups and carboxyl groups correspond to the polar groups of the polyimide precursor and the polyimide resin.

As described above, the endless belt according to this exemplary embodiment, having the configuration described above, may have a reduced susceptibility to breakage upon meandering.

Polyimide Resin Layer

A polyimide precursor composition for obtaining the polyimide resin of the polyimide resin layer forming the endless belt will hereinafter be described.

Polyimide Precursor Composition

The polyimide precursor composition is a polyimide precursor composition containing a resin containing repeating units represented by general formula (I) (hereinafter referred to as "polyimide precursor") and at least one solvent selected from a solvent group A consisting of urea-based solvents, alkoxy-group-containing amide-based solvents, and ester-group-containing amide-based solvents.

The polyimide precursor composition contains a polyimide precursor containing two or more types of structural units derived from tetracarboxylic dianhydrides and/or two or more types of structural units derived from diamine compounds. The polyimide precursor may be a copolymer containing repeating units represented by general formula (I) or a mixture of different homopolymers containing repeating units represented by general formula (I).

The polyimide precursor composition may optionally contain conductive particles, described later, and other additives.

Polyimide Precursor

The polyimide precursor may be a resin (polyamic acid) containing repeating units represented by general formula

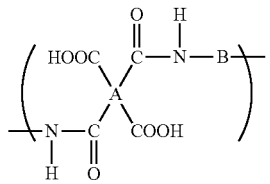

In general formula (I), A represents a tetravalent organic group, and B represents a divalent organic group.

Here, the tetravalent organic group represented by A in general formula (I) is a residue of a tetracarboxylic dianhydride used as a raw material from which the four carboxyl groups have been removed.

On the other hand, the divalent organic group represented by B is a residue of a diamine compound used as a raw material from which the two amino groups have been removed.

That is, the polyimide precursor containing repeating units represented by general formula (I) is a polymer of a tetracarboxylic dianhydride and a diamine compound. In other words, the polyimide precursor contains a component derived from a tetracarboxylic dianhydride and a component derived from a diamine compound.

The tetracarboxylic dianhydride may be an aromatic compound or an aliphatic compound, preferably an aromatic compound. That is, the tetravalent organic group represented by A in general formula (I) is preferably an aromatic organic group.

Examples of aromatic tetracarboxylic dianhydrides include pyromellitic dianhydride, 3,3',4,4'-benzophenonetetracarboxylic dianhydride, 3,3',4,4'-biphenyl sulfone tetracarboxylic dianhydride, 1,4,5,8-naphthalenetetracarboxylic dianhydride, 2,3,6,7-naphthalenetetracarboxylic dianhydride, 3,3',4,4'-biphenyl ether tetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenyl sulfide dianhydride, 4,4'-bis(3, 4-dicarboxyphenoxy)diphenyl sulfone dianhydride, 4,4'-bis (3,4-dicarboxyphenoxy)diphenylpropane dianhydride, 3,3', 4,4'-perfluoroisopropylidenediphthalic dianhydride, 2,3,3',4, 4'-biphenyltetracarboxylic dianhydride, 2,3,3',4'-biphenyltetracarboxylic dianhydride, bis(phthalic) phenylphosphine oxide dianhydride, p-phenylene-bis(triphenylphthalic) dianhydride, m-phenylene-bis(triphenylphthalic) dianhydride, bis(triphenylphthalic)-4,4'-diphenyl ether dianhydride, bis(triphenylphthalic)-4,4'-diphenylmethane dianhydride, and 4,4'-oxydiphthalic dianhydride (ODPA).

Examples of aliphatic tetracarboxylic dianhydrides include aliphatic and alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 5-(2,5-dioxotetrahydrofuryl)-3-methyl-3-cyclohexene-1,2-dicarboxylic dianhydride, and bicyclo[2,2,2]-oct-7-ene-2,3, 5,6-tetracarboxylic dianhydride; and aliphatic tetracarboxylic dianhydrides having aromatic rings, such as 1,3,3a,4,5,9b-hexahydro-2,5-dioxo-3-furanyl)-naphtho[1,2- c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Among these, aromatic tetracarboxylic dianhydrides are preferred as tetracarboxylic dianhydrides, specific examples thereof including pyromellitic dianhydride, 3,3',4,4'-biphenyltetracarboxylic dianhydride, 2,3,3',4'-biphenyltetracarboxylic dianhydride, 3,3',4,4'-biphenyl ether tetracarboxylic dianhydride, 3,3',4,4'-benzophenonetetracarboxylic dianhydride, and 4,4'-oxydiphthalic dianhydride, more preferably pyromellitic dianhydride, 3,3',4,4'-biphenyltetracarboxylic dianhydride, 3,3',4,4'-benzophenonetetracarboxylic dianhydride, and 4,4'-oxydiphthalic dianhydride, particularly preferably 3,3',4,4'-biphenyltetracarboxylic dianhydride.

These tetracarboxylic dianhydrides may be used alone or in a combination of two or more thereof.

If a combination of two or more tetracarboxylic dianhydrides are used, a combination of aromatic tetracarboxylic dianhydrides, a combination of aliphatic tetracarboxylic dianhydrides, or a combination of aromatic and aliphatic tetracarboxylic dianhydrides may be used.

If the polyimide precursor contains two or more types of structural units derived from tetracarboxylic dianhydrides, the structural units derived from tetracarboxylic dianhydrides may be present in any manner. For example, the structural units derived from tetracarboxylic dianhydrides may be present as a copolymer using two or more tetracarboxylic dianhydrides or as a mixture of such copolymers. The structural units derived from tetracarboxylic dianhydrides may also be present as a mixture of a homopolymer using one tetracarboxylic dianhydride and a homopolymer or copolymer using a different tetracarboxylic dianhydride.

If the polyimide precursor contains two or more types of structural units derived from tetracarboxylic dianhydrides, the structural units derived from tetracarboxylic dianhydrides may include structural units derived from 3,3',4,4'-biphenyltetracarboxylic dianhydride to reduce the susceptibility to cracking upon meandering.

In particular, if the polyimide precursor contains structural units derived from 3,3',4,4'-biphenyltetracarboxylic dianhydride, the structural units derived from 3,3',4,4'-biphenyltetracarboxylic dianhydride may be present in an amount of from 70% by weight to 99% by weight (preferably from 80% by weight to 95% by weight) based on the total weight of the structural units derived from tetracarboxylic dianhydrides.

On the other hand, the diamine compound is a diamine compound having two amino groups in the molecular structure thereof. The diamine compound may be an aromatic compound or an aliphatic compound, preferably an aromatic compound. That is, the divalent organic group represented by B in general formula (I) is preferably an aromatic organic group.

Examples of diamine compounds include aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenyl sulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)biphenyl, 1,3'-bis(4-aminophenoxy)benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups attached to an aromatic ring and a heteroatom other than the nitrogen atoms in the amino groups, such as diaminotetraphenylthiophene; and aliphatic diamines and alicyclic diamines such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,0$^{2.7}$]-undecylenedimethyldiamine, and 4,4'-methylenebis(cyclohexylamine).

Among these, aromatic diamine compounds are preferred as diamine compounds, specific examples thereof including p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diaminodiphenyl sulfone, particularly preferably 4,4'-diaminodiphenyl ether and p-phenylenediamine.

These diamine compounds may be used alone or in a combination of two or more thereof. To reduce the susceptibility to breakage upon meandering, two or more diamine compounds may be used. If a combination of two or more diamine compounds are used, a combination of aromatic diamine compounds, a combination of aliphatic diamine compounds, or a combination of aromatic and aliphatic diamine compounds may be used.

If the polyimide precursor contains two or more types of structural units derived from diamine compounds, the structural units derived from diamine compounds may be present in any manner. For example, the structural units derived from diamine compounds may be present as a copolymer using two or more diamine compounds or as a mixture of such copolymers. The structural units derived from diamine compounds may also be present as a mixture of a homopolymer using one diamine compound and a homopolymer or copolymer using a different diamine compound.

If the polyimide precursor contains two or more types of structural units derived from diamine compounds, the structural units derived from diamine compounds may include at least structural units derived from 4,4'-diaminodiphenyl ether or structural units derived from p-phenylenediamine to reduce the susceptibility to breakage upon meandering. For the same reason, the structural units derived from diamine compounds may include both structural units derived from 4,4'-diaminodiphenyl ether and structural units derived from p-phenylenediamine. Among these, the structural units derived from diamine compounds preferably include at least structural units derived from 4,4'-diaminodiphenyl ether.

In particular, if the polyimide precursor contains structural units derived from 4,4'-diaminodiphenyl ether, the structural units derived from 4,4'-diaminodiphenyl ether may be present in an amount of from 70% by weight to 90% by weight (preferably from 75% by weight to 85% by weight) based on the total weight of the structural units derived from diamine compounds. If the polyimide precursor contains two or more types of structural units derived from diamine compounds, a combination of 4,4'-diaminodiphenyl ether and p-phenylenediamine in a weight ratio of from 70/30 to 90/10 may be used.

The polyimide precursor may be a partially imidized resin.

Specifically, the polyimide precursor may be, for example, a resin containing repeating units represented by general formula (I-1), general formula (I-2), and general formula (I-3).

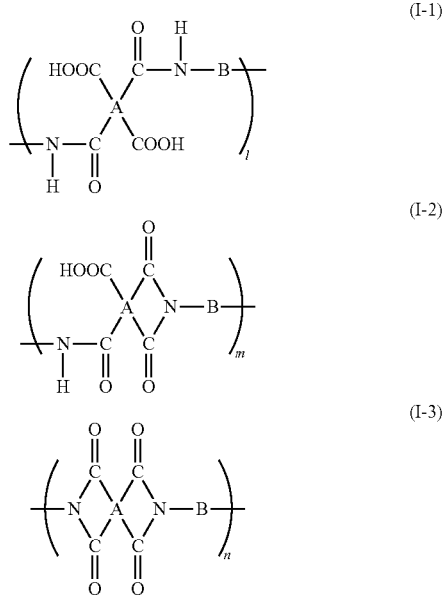

In general formula (I-1), general formula (I-2), and general formula (I-3), A represents a tetravalent organic group, and B represents a divalent organic group. A and B are synonymous with A and B in general formula (I).

l represents an integer of 1 or more, and m and n each independently represent an integer of 0, 1, or more.

Here, among the bond sites (reaction sites between the tetracarboxylic dianhydride and the diamine compound) in the polyimide precursor, the proportion of the number of imide-ring-closed bond sites (2n+m) to the total number of bond sites (2l+2m+2n), i.e., the imidization ratio of the polyimide precursor, is represented as "(2n+m)/(2l+2m+2n)". This value is preferably 0.2 or less, more preferably 0.15 or less, most preferably 0.1 or less.

If the imidization ratio falls within this range, the polyimide precursor may have a reduced susceptibility to gelling and precipitation separation.

The imidization ratio of the polyimide precursor (the value of "(2n+m)/(2l+2m+2n)") is measured by the following method.

Measurement of Imidization Ratio of Polyimide Precursor

Preparation of Polyimide Precursor Sample (i) A polyimide precursor composition for measurement is applied at a thickness of from 1 μm to 10 μm to a silicon wafer to prepare a coating sample.

(ii) The coating sample is immersed in tetrahydrofuran (THF) for 20 minutes to replace the solvent in the coating sample with tetrahydrofuran (THF). The solvent used for immersion is not limited to THF, but may be selected from solvents that do not dissolve the polyimide precursor and that are miscible with the solvent component present in the polyimide precursor composition. Specifically, alcohol solvents such as methanol and ethanol and ether compounds such as dioxane may be used.

(iii) The coating sample is taken from the THF, and the THF deposited on the surface of the coating sample is removed by spraying with $N_2$ gas. The coating sample is dried by treatment under a reduced pressure of 10 mmHg or less at from 5° C. to 25° C. for 12 hours or more to prepare a polyimide precursor sample.

Preparation of 100% Imidized Standard Sample (iv) As in (i) above, the polyimide precursor composition for measurement is applied to a silicon wafer to prepare a coating sample.

(v) The coating sample is heated at 380° C. for 60 minutes to cause an imidization reaction, thereby preparing a 100% imidized standard sample.

Measurement and Analysis (vi) The infrared absorption spectra of the 100% imidized standard sample and the polyimide precursor sample are measured using a Fourier transform infrared spectrometer (FT-730 manufactured by Horiba, Ltd.). The ratio of an absorption peak derived from imide bonds around 1,780 $cm^{-1}$ (Ab'(1,780 $cm^{-1}$)) to an absorption peak derived from aromatic rings around 1,500 $cm^{-1}$ (Ab'(1,500 $cm^{-1}$)) of the 100% imidized standard sample, I'(100), is determined.

(vii) By performing a measurement on the polyimide precursor sample in the same manner, the ratio of an absorption peak derived from imide bonds around 1,780 $cm^{-1}$ (Ab(1,780 $cm^{-1}$)) to an absorption peak derived from aromatic rings around 1,500 $cm^{-1}$ (Ab(1,500 $cm^{-1}$)), I(x), is determined.

The measured absorption peak ratios I'(100) and I(x) are used to calculate the imidization ratio of the polyimide precursor based on the following equations:

$$\text{imidization ratio of polyimide precursor} = I(x)/I'(100) \quad \text{Equation:}$$

$$I'(100) = (Ab'(1,780\ cm^{-1}))/(Ab'(1,500\ cm^{-1})) \quad \text{Equation:}$$

$$I(x) = (Ab(1,780\ cm^{-1}))/(Ab(1,500\ cm^{-1})) \quad \text{Equation:}$$

This measurement of the imidization ratio of the polyimide precursor is applied to the measurement of the imidization ratio of aromatic polyimide precursors. To measure the imidization ratio of aliphatic polyimide precursors, a peak derived from a structure that does not change after an imidization reaction is used as an internal standard peak instead of an absorption peak derived from aromatic rings.

Amino End Groups of Polyimide Precursor

The polyimide precursor may contain a polyimide precursor (resin) having an amino group at an end thereof, preferably a polyimide precursor having amino groups at all ends thereof.

To allow the polyimide precursor to have amino groups at the molecular ends thereof, for example, the diamine compound used in the polymerization reaction is added such that the number of molar equivalents of the diamine compound is in excess of the number of molar equivalents of the tetracarboxylic dianhydride. The ratio of the number of molar equivalents of the tetracarboxylic dianhydride to the number of molar equivalents of the diamine compound is preferably in the range from 0.9 to 0.9999, more preferably in the range from 0.93 to 0.999, with the number of molar equivalents of the diamine compound being 1.

If the ratio of the number of molar equivalents of the tetracarboxylic dianhydride to the number of molar equivalents of the diamine compound is 0.9 or more, as the ratio becomes closer to 0.9, the amino groups at the molecular ends may be more effective, and good dispersibility may be more easily achieved. If the ratio of the number of molar equivalents is 0.9999 or less, as the ratio becomes closer to 0.9999, the resulting polyimide precursor may have a larger molecular weight, and, for example, a polyimide resin molded product with sufficient strength (tear strength or tensile strength) may be more easily achieved.

The amino end groups of the polyimide precursor are detected by treating the polyimide precursor composition with trifluoroacetic anhydride (which reacts quantitatively with amino groups). Specifically, the amino end groups of the polyimide precursor are trifluoroacetylated with trifluoroacetic anhydride. After the treatment, the polyimide precursor is purified by a process such as reprecipitation to remove excess trifluoroacetic anhydride and trifluoroacetic acid residue. The amount of amino end groups in the polyimide precursor after the treatment is measured by determining the amount of fluorine atoms introduced into the polyimide precursor by nuclear magnetic resonance ($^{19}$F-NMR).

The polyimide precursor preferably has a number average molecular weight of from 5,000 to 100,000, more preferably from 7,000 to 50,000, even more preferably from 10,000 to 30,000.

If the polyimide precursor has a number average molecular weight within the above range, the polyimide precursor may have good solubility in the composition and good film mechanical properties after film formation.

A polyimide precursor having the target number average molecular weight is obtained by adjusting the ratio of the number of molar equivalents of the tetracarboxylic dianhydride to the number of molar equivalents of the diamine compound.

The number average molecular weight of the polyimide precursor is measured by a gel permeation chromatography (GPC) technique under the following measurement conditions:

Column: Tosoh TSKgel α-M (7.8 mm I.D×30 cm)
Eluent: dimethylformamide (DMF)/30 mM LiBr/60 mM phosphoric acid
Flow rate: 0.6 mL/min
Injection volume: 60 μL
Detector: differential refractive index detector (RI)

The polyimide precursor may be present in an amount (concentration) of from 0.1% by weight to 40% by weight, preferably from 0.5% by weight to 25% by weight, more preferably from 1% by weight to 20% by weight, of the total weight of the polyimide precursor composition.

Solvent Group A

First, the content of the solvent of the solvent group A present in the polyimide resin layer will be described.

Content of Solvent of Solvent Group A

The endless belt according to this exemplary embodiment contains at least one solvent selected from a solvent group A consisting of urea-based solvents, alkoxy-group-containing amide-based solvents, and ester-group-containing amide-based solvents present in the polyimide resin layer forming the endless belt in an amount, by weight, of from 50 ppm to 2,000 ppm or from about 50 ppm to about 2,000 ppm. To reduce the susceptibility to breakage upon meandering, the solvent of the solvent group A is preferably present in an amount of from about 70 ppm to 1,500 ppm or from about 70 ppm to about 1,500 ppm, more preferably from 100 ppm to 1,000 ppm or from about 100 ppm to about 1,000 ppm.

The content of at least one solvent selected from the solvent group A refers to the total amount of solvents selected from the solvent group A and is the content based on the total amount of the polyimide resin layer.

Here, the content of the solvent selected from the solvent group A present in the polyimide resin layer forming the endless belt according to this exemplary embodiment may be controlled to the range from 50 ppm to 2,000 ppm or from about 50 ppm to about 2,000 ppm by any method. For example, the following methods may be used.

For air blow drying, for example, methods such as controlling the air blow speed; and rotating the endless belt and controlling its rotational speed may be used. If a mold is used, methods such as changing the thickness of the mold and thereby controlling its thermal capacity; and controlling the temperature of the mold may be used.

The content of the solvent (residual solvent) present in the polyimide resin layer forming the endless belt may be measured by taking a measurement sample from the polyimide resin layer of the endless belt for measurement and performing a measurement with, for example, a gas chromatograph-mass spectrometer (GC-MS). Specifically, the measurement sample may be analyzed with a gas chromatograph-mass spectrometer (GCMS QP-2010 manufactured by Shimadzu Corporation) equipped with a fall-type pyrolyzer (PY-2020D manufactured by Frontier Laboratories Ltd.).

The content of the solvent present in the polyimide resin layer forming the endless belt is measured at a pyrolysis temperature of 400° C. using 0.40 mg of a measurement sample precisely weighed from the polyimide resin layer.

Pyrolyzer: PY-2020D manufactured by Frontier Laboratories Ltd.
Gas chromatograph-mass spectrometer: GCMS QP-2010 manufactured by Shimadzu Corporation
Pyrolysis temperature: 400° C.
Gas chromatograph introduction temperature: 280° C.
Injection method: split ratio=1:50
Column: Ultra ALLOY-5 manufactured by Frontier Laboratories Ltd., 0.25 μm, 0.25 mm ID, 30 m
Gas chromatograph temperature program: 40° C.→20° C./min→held at 280° C. for 10 min
Mass range: EI, m/z=29-600

For example, if the endless belt is used as an intermediate transfer belt, the outer peripheral surface thereof preferably has a surface resistivity on a common logarithmic scale of from 8 (Log Ω/□) to 13 (Log Ω/□), more preferably from 8 (Log Ω/□) to 12 (Log Ω/□). If the surface resistivity on a common logarithmic scale is more than 13 (Log Ω/□), a recording medium may be electrostatically attracted to the intermediate transfer member during second transfer and may thus be difficult to separate therefrom. On the other hand, if the surface resistivity on a common logarithmic scale is less than 8 (Log Ω/□), the retention force of the toner image on the intermediate transfer member after first transfer may be insufficient and may thus leave image graininess and image disturbance.

The surface resistivity on a common logarithmic scale is controlled by changing the type of conductive particles and the amount of conductive particles added.

The solvents of the solvent group A will hereinafter be described in detail.

Urea-Based Solvents

Urea-based solvents are solvents having a urea group (N—C(=O)—N). Specifically, urea-based solvents may have the structure *—N(Ra$^1$)—C(=O)—N(Ra$^2$)—*, where Ra$^1$ and Ra$^2$ each independently represent a hydrogen atom, an alkyl group, a phenyl group, or a phenylalkyl group. Both ends of the two N atoms, *, represent a site linked to another atomic group of the structure. Urea-based solvents may have a ring structure in which both ends of the two N atoms, *, are linked to each other, for example, with a linking group such as alkylene, —O—, —C(=O)—, or any combination thereof therebetween.

The alkyl groups represented by $Ra^1$ and $Ra^2$ may be linear, branched, or cyclic and may have a substituent. Specific examples of alkyl groups include alkyl groups having from 1 to 6 (preferably from 1 to 4) carbon atoms (e.g., a methyl group, an ethyl group, an n-propyl group, an i-propyl group, and an n-butyl group).

The substituent for the alkyl groups may be, for example, an alkoxy group having from 1 to 4 carbon atoms, a hydroxyl group, a ketone group, an ester group, or an alkylcarbonyloxy group.

Specific examples of ketone groups include a methylcarbonyl group (acetyl group), an ethylcarbonyl group, and an n-propylcarbonyl group. Specific examples of ester groups include a methoxycarbonyl group, an ethoxycarbonyl group, an n-propoxycarbonyl group, and an acetoxy group. Specific examples of alkylcarbonyloxy groups include a methylcarbonyloxy group (acetyloxy group), an ethylcarbonyloxy group, and an n-propylcarbonyloxy group.

The phenyl backbones of the phenyl groups and the phenylalkyl groups represented by $Ra^1$ and $Ra^e$ may have a substituent. The substituent for the phenyl backbones may be similar to the substituent for the alkyl groups described above.

If urea-based solvents have a ring structure in which both ends of the two N atoms, *, are linked to each other as described above, the ring structure may be five-membered or six-membered.

Examples of urea-based solvents include 1,3-dimethylurea, 1,3-diethylurea, 1,3-diphenylurea, 1,3-dicyclohexylurea, tetramethylurea, tetraethylurea, 2-imidazolidinone, propyleneurea, 1,3-dimethyl-2-imidazolidinone, and N,N-dimethylpropyleneurea.

Among these, 1,3-dimethylurea, 1,3-diethylurea, tetramethylurea, tetraethylurea, 1,3-dimethyl-2-imidazolidinone, and N,N-dimethylpropyleneurea are preferred as urea-based solvents to reduce the susceptibility to breakage upon meandering and to improve the stability at room temperature and during cold storage. Most preferred are tetramethylurea, tetraethylurea, 1,3-dimethyl-2-imidazolidinone, and N,N-dimethylpropyleneurea. Alkoxy-Group-Containing Amide-Based Solvents and Ester-Group-Containing Amide-Based Solvents Alkoxy-group-containing amide-based solvents are solvents having an alkoxy group and an amide group. Ester-group-containing amide-based solvents, on the other hand, are solvents having an ester group and an amide group. The alkoxy group and the ester group may be similar to those listed as examples of substituents for the alkyl groups represented by $Ra^1$ and $Ra^2$ in the description of urea-based solvents. Alkoxy-group-containing amide-based solvents may have an ester group, whereas ester-group-containing amide-based solvents may have an alkoxy group.

In the following description, alkoxy-group-containing amide-based solvents and ester-group-containing amide-based solvents are both referred to as "alkoxy-group- or ester-group-containing amide-based solvents".

Specific examples of suitable alkoxy-group- or ester-group-containing amide-based solvents include, but not limited to, amide-based solvents represented by general formula (Am1) below and amide-based solvents represented by general formula (Am2) below.

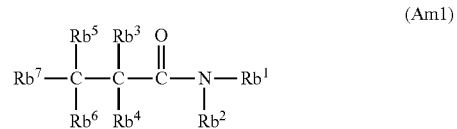

(Am1)

In general formula (Am1), $Rb^1$, $Rb^2$, $Rb^3$, $Rb^4$, $Rb^5$, and $Rb^6$ each independently represent a hydrogen atom or an alkyl group, and $Rb^7$ represents an alkoxy group or an ester group.

The alkyl groups represented by $Rb^1$ to $Rb^6$ are synonymous with the alkyl groups represented by $Ra^1$ and $Ra^2$ mentioned in the description of urea-based solvents.

The alkoxy group and the ester group represented by $Rb^7$ are synonymous with alkoxy groups and ester groups listed as examples of substituents for the alkyl groups represented by $Ra^1$ and $Ra^2$ in the description of urea-based solvents.

Specific non-limiting examples of amide-based solvents represented by general formula (Am1) are listed below.

| Example Compound No. | $Rb^1$ | $Rb^2$ | $Rb^3$ | $Rb^4$ | $Rb^5$ | $Rb^6$ | $Rb^7$ |
| --- | --- | --- | --- | --- | --- | --- | --- |
| B-1 | Me | Me | H | H | H | H | —$CO_2$Me |
| B-2 | Me | Me | H | H | H | H | —$CO_2$Et |
| B-3 | Et | Et | H | H | H | H | —$CO_2$Me |
| B-4 | Me | Me | H | H | H | H | —OMe |
| B-5 | Me | Me | H | H | H | H | —OEt |
| B-6 | Me | Me | H | H | H | H | —OnPr |
| B-7 | Me | Me | H | H | H | H | —OnBu |
| B-8 | Et | Et | H | H | H | H | —OMe |
| B-9 | Me | Me | H | H | H | H | —OC(=O)Me |
| B-10 | Me | Me | Me | H | H | H | —OMe |

In the specific examples of amide-based solvents represented by general formula (Am1), Me=methyl group, Et=ethyl group, nPr=n-propyl group, and nBu=n-butyl group.

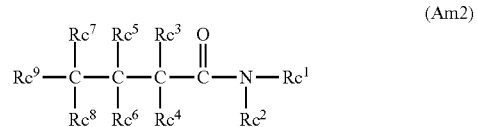

(Am2)

In general formula (Am2), $Rc^1$, $Rc^2$, $Rc^3$, $Rc^4$, $Rc^5$, $Rc^6$, $Rc^7$, and $Rc^8$ each independently represent a hydrogen atom or an alkyl group, and $Rc^9$ represents an alkoxy group or an ester group.

The alkyl groups represented by $Rc^1$ to $Rc^9$ are synonymous with the alkyl groups represented by $Ra^1$ and $Ra^2$ mentioned in the description of urea-based solvents.

The alkoxy group and the ester group represented by $Rc^9$ are synonymous with alkoxy groups and ester groups listed as examples of substituents for the alkyl groups represented by $Ra^1$ and $Ra^2$ in the description of urea-based solvents.

Specific non-limiting examples of amide-based solvents represented by general formula (Am2) are listed below.

| Example Compound No. | Rc¹ | Rc² | Rc³ | Rc⁴ | Rc⁵ | Rc⁶ | Rc⁷ | Rc⁸ | Rc⁹ |
| --- | --- | --- | --- | --- | --- | --- | --- | --- | --- |
| C-1 | Me | Me | H | H | H | H | H | H | —CO$_2$Me |
| C-2 | Me | Me | Me | H | H | H | H | H | —CO$_2$Me |
| C-3 | Me | Me | H | H | H | H | Me | H | —CO$_2$Me |
| C-4 | Et | Et | H | H | H | H | H | H | —OMe |
| C-5 | Me | Me | H | H | Me | H | H | H | —CO$_2$Me |
| C-6 | Me | Me | H | H | H | H | H | H | —CO$_2$Et |
| C-7 | Me | Me | H | H | H | H | Me | H | —CO$_2$Et |
| C-8 | Me | Me | H | H | H | H | H | H | —OC(=O)Me |
| C-9 | Me | Me | H | H | H | H | H | H | —OEt |
| C-10 | Me | Me | H | H | H | H | H | H | —OnPr |

In the specific examples of amide-based solvents represented by general formula (Am2), Me=methyl group, Et=ethyl group, and nPr=n-propyl group.

Among these, 3-methoxy-N,N-dimethylpropanamide (Example Compound B-4), 3-n-butoxy-N,N-dimethylpropanamide (Example Compound B-7), and methyl 5-dimethylamino-2-methyl-5-oxo-pentanoate (Example Compound C-3) are preferred as alkoxy-group- or ester-group-containing amide-based solvents to reduce the susceptibility to breakage upon meandering. More preferred is 3-methoxy-N,N-dimethylpropanamide (Example Compound B-4).

To reduce the susceptibility to breakage upon meandering, it is preferred that the solvent group A, which is a group of organic solvents, be a solvent group consisting of tetramethylurea, tetraethylurea, 1,3-dimethyl-2-imidazolidinone, N,N-dimethylpropyleneurea, and 3-methoxy-N,N-dimethylpropanamide. For the same reason, 1,3-dimethyl-2-imidazolidinone is more preferred.

1,3-Dimethyl-2-imidazolidinone has two amide-group nitrogen atoms per molecule. Therefore, 1,3-dimethyl-2-imidazolidinone is more likely to interact with polyamide-imide resins than, for example, N-methylpyrrolidone, which is a conventionally used solvent having only one amide-group nitrogen atom per molecule. Furthermore, since 1,3-dimethylimidazolidinone has a cyclic structure and is therefore in a stable conformation, 1,3-dimethylimidazolidinone is more likely to interact with polyamide-imide resins than, for example, tetramethylurea, which is noncyclic. Thus, 1,3-dimethylimidazolidinone is presumed to be a more suitable solvent.

Boiling Point of Solvents of Solvent Group A

The solvents of the solvent group A (each solvent of the above particular solvent group A) preferably have a boiling point of, for example, from 100° C. to 350° C., more preferably from 120° C. to 300° C., even more preferably from 150° C. to 250° C. If the solvents of the solvent group A have a boiling point of from 100° C. to 350° C., the amount of solvent of the solvent group A remaining in the endless belt may be easily controlled to the range from 50 ppm to 2,000 ppm or from about 50 ppm to about 2,000 ppm by weight.

Conductive Particles

The polyimide resin layer forming the endless belt according to this exemplary embodiment may optionally contain conductive particles, which are added to impart conductivity. The conductive particles may be conductive (e.g., having a volume resistivity of less than $10^7$ Ω·cm; the same applies hereinafter) or semiconductive (e.g., having a volume resistivity of from $10^7$ Ω·cm to $10^{13}$ Ω·cm; the same applies hereinafter) and are selected depending on the purpose of use.

Examples of conductive particles include carbon black, metals (e.g., aluminum and nickel), metal oxides (e.g., yttrium oxide and tin oxide), and ionically conductive materials (e.g., potassium titanate and LiCl).

These conductive particles may be used alone or in a combination of two or more thereof. The conductive particles may have a primary particle size of less than 10 μm (preferably 1 μm or less).

Among these, carbon blacks are preferred as conductive particles, particularly preferably acidic carbon blacks having a pH of 5.0 or less.

Examples of acidic carbon blacks include carbon blacks having the surface thereof subjected to oxidation treatment, for example, carbon blacks having the surface thereof modified with carboxyl groups, quinone groups, lactone groups, hydroxyl groups, or other groups.

If an acidic carbon black is used for a transfer belt including a polyimide resin layer containing a polyimide resin, a carbon black having a pH of 4.5 or less is desirable, and an acidic carbon black having a pH of 4.0 or less is more desirable, from the viewpoint of the stability of electrical resistance over time and electric field dependence for reduced electric field concentration due to a transfer voltage.

The pH of acidic carbon blacks is measured by the pH measurement method in accordance with JIS Z8802(2011).

Specific examples of carbon blacks include "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", and "COLOR BLACK FW2V" manufactured by Orion Engineered Carbons and "MONARCH 1000", "MONARCH 1300", "MONARCH 1400", "MOGUL-L", and "REGAL 400R" manufactured by Cabot Corporation.

The content of the conductive particles is preferably, but not limited to, from 1 part by weight to 40 parts by weight (preferably from 10 parts by weight to 30 parts by weight) per 100 parts by weight of the polyimide resin in the polyimide resin layer from the viewpoint of the visual, mechanical, and electrical quality of the endless belt. The conductive particles may be incorporated into the polyimide precursor composition for obtaining the polyimide resin layer described above.

Other Additives

The polyimide resin layer forming the endless belt according to this exemplary embodiment may contain other additives such as various fillers for imparting various functions such as mechanical strength. The polyimide resin layer forming the endless belt according to this exemplary embodiment may also contain other additives such as catalysts for promoting the imidization reaction and leveling agents for improving the film-forming quality.

Examples of fillers that may be added to improve the mechanical strength include particulate materials such as silica powder, alumina powder, barium sulfate powder, titanium oxide powder, mica, and talc. To improve the water repellency and releasability of the surface of the polyimide resin layer, for example, fluorocarbon resin powders such as polytetrafluoroethylene (PTFE) and tetrafluoroethylene-perfluoro(alkyl vinyl ether) copolymers (PFA) may also be added.

Examples of catalysts that may be used to promote the imidization reaction include dehydrating agents such as acid anhydrides and acid catalysts such as phenol derivatives, sulfonic acid derivatives, and benzoic acid derivatives.

Surfactants may be added to improve the film-forming quality of the polyimide resin layer. Examples of surfactants that may be used include cationic, anionic, and nonionic surfactants.

The contents of other additives may be selected depending on the target properties of the polyimide resin layer. Other additives may be incorporated into the polyimide precursor composition for obtaining the polyimide resin layer described above.

Method for Manufacturing Polyimide Precursor Composition

The polyimide precursor composition may be manufactured by any method. An example method involves polymerizing the tetracarboxylic dianhydride and the diamine compound described above in a solvent containing at least one organic solvent selected from the solvent group A to obtain a polyimide precursor.

The reaction temperature during the polymerization reaction of the polyimide precursor may be, for example, from 0° C. to 70° C., preferably from 10° C. to 60° C., more preferably from 20° C. to 55° C. If this reaction temperature is 0° C. or higher, the progress of the polymerization reaction may be promoted, and the time required for the reaction may be shortened, so that the productivity may be more easily improved. On the other hand, if the reaction temperature is 70° C. or lower, the progress of an imidization reaction that occurs in the molecules of the resulting polyimide precursor may be inhibited, so that the precipitation or gelation of the polyimide precursor due to decreased solubility may be easily inhibited.

The polymerization reaction of the polyimide precursor may be performed for from 1 hour to 24 hours, depending on the reaction temperature.

Method for Manufacturing Endless Belt

The endless belt according to this exemplary embodiment includes a polyimide resin layer containing a polyimide resin. The polyimide resin layer is obtained by applying the polyimide precursor composition described above as a coating solution for forming an endless belt to a substrate to be coated and then drying and firing the coating. That is, the polyimide resin layer contains a polyimide resin containing two or more types of structural units derived from tetracarboxylic dianhydrides and/or two or more types of structural units derived from diamine compounds. The structural units derived from tetracarboxylic dianhydrides and the structural units derived from diamine compounds are similar to those described for the above polyimide precursor composition.

Here, the contents of the monomer-derived structural units forming the polyimide resin in the polyimide resin layer may be measured, for example, by analyzing and quantifying the components detected by pyrolysis gas chromatography-mass spectrometry (GC-MS). Specifically, a measurement sample of a polyimide resin layer is first taken from an endless belt for measurement. A measurement is then performed on the measurement sample with a gas chromatograph-mass spectrometer (GCMS QP-2010 manufactured by Shimadzu Corporation) equipped with a fall-type pyrolyzer (PY-2020D manufactured by Frontier Laboratories Ltd.). The pyrolysis gas chromatograph-mass spectrometer decomposes the polyimide resin into monomer units, and the decomposition products obtained by decomposition are subjected to mass spectrometry to determine the structures and proportions of the monomers.

Specifically, for example, the endless belt may be manufactured by the following method.

An example method for manufacturing the endless belt involves a step of applying the polyimide precursor composition to a cylindrical substrate (mold) to form a coating, a step of drying the coating formed on the substrate to form a dry film, a step of imidizing the polyimide precursor by subjecting the dry film to imidization treatment (heating treatment) to form a polyimide resin molded product, and a step of removing the polyimide resin molded product from the substrate to obtain an endless belt. This polyimide resin molded product serves as a polyimide resin layer. Specifically, for example, the endless belt is manufactured as follows.

The polyimide precursor composition is first applied to the inner surface or outer surface of a cylindrical substrate to form a coating. For example, a cylindrical metal substrate is suitable for use as the cylindrical substrate. Substrates made of other materials such as resins, glasses, and ceramics may also be used instead of substrates made of metals. The substrate may have a coating, such as a glass coating or a ceramic coating, on the surface thereof, or may have a release agent, such as a silicone-based release agent or a fluorinated release agent, applied to the surface thereof.

Here, to accurately apply the polyimide precursor composition, a step of defoaming the polyimide precursor composition may be carried out before application. Defoaming the polyimide precursor composition may reduce the likelihood of bubble entrapment upon application and the formation of defects in the coating.

Examples of methods for defoaming the polyimide precursor composition include methods involving reduced pressure and methods involving centrifugation. Defoaming under reduced pressure is suitable since this method is simple and has high defoaming performance.

The cylindrical substrate having the coating of the polyimide precursor composition formed thereon is then placed in a heated or vacuum environment to dry the coating, thereby forming a dry film. This volatilizes 30% by weight or more, preferably 50% by weight or more, of the solvent present in the coating.

The dry film is then subjected to imidization treatment (heating treatment). A polyimide resin molded product is thereby formed.

As the heating conditions for the imidization treatment, for example, if heating is performed at from 150° C. to 400° C. (preferably from 200° C. to 300° C.) for from 20 minutes to 60 minutes, an imidization reaction occurs, thus forming a polyimide resin molded product. During the heating reaction, heating may be performed while the temperature is gradually increased stepwise or at constant rate before the final heating temperature is reached. The imidization temperature varies depending on, for example, the types of tetracarboxylic dianhydride and diamine used as raw materials. The imidization temperature is set to a temperature that completes imidization since insufficient imidization would result in poor mechanical and electrical characteristics.

Subsequently, the polyimide resin molded product is removed from the cylindrical substrate to obtain an endless belt.

As the endless belt according to this exemplary embodiment, the polyimide resin molded product may be directly used as a single-layer product to provide an endless belt including a polyimide resin layer. Alternatively, the polyimide resin molded product may be used as a multilayer product including a functional layer, such as a release layer, on at least one of the inner and outer peripheral surfaces of the polyimide resin molded product to provide an endless belt including a polyimide resin layer.

Example Uses of Endless Belt

The endless belt according to this exemplary embodiment may be used as, for example, an endless belt for an electrophotographic image-forming apparatus. Examples of endless belts for electrophotographic image-forming apparatuses include intermediate transfer belts, transfer belts (recording medium transport belts), fixing belts (heating belts and pressing belts), and transport belts (recording medium transport belts). The endless belt according to this exemplary embodiment may also be used for applications other than endless belts for electrophotographic image-forming apparatuses, including, for example, belt-shaped members such as transport belts, drive belts, laminate belts, electrical insulating materials, pipe covering materials, electromagnetic insulating materials, heat source insulators, and electromagnetic absorbing films.

Image-Forming Apparatus

An image-forming apparatus according to this exemplary embodiment includes the endless belt described above. If the endless belt is used as a belt such as an intermediate transfer belt, a transfer belt, or a transport belt (recording medium transport belt), the image-forming apparatus according to this exemplary embodiment may be, for example, the following image-forming apparatus.

An example image-forming apparatus includes an image carrier, a charging section that charges a surface of the image carrier, an electrostatic-charge-image forming section that forms an electrostatic charge image on the charged surface of the image carrier, a developing section that develops the electrostatic charge image formed on the surface of the image carrier with a developer containing a toner to form a toner image, and a transfer section that transfers the toner image to a surface of a recording medium via the endless belt according to this exemplary embodiment.

The transfer section may include the endless belt unit described later.

Specifically, the image-forming apparatus according to this exemplary embodiment may have a configuration including, for example, a transfer section including an intermediate transfer member, a first transfer section that performs first transfer of a toner image formed on an image carrier to the intermediate transfer member, and a second transfer section that performs second transfer of the toner image transferred to the intermediate transfer member to a recording medium. This configuration may include the endless belt according to this exemplary embodiment as the intermediate transfer member.

Alternatively, the image-forming apparatus according to this exemplary embodiment may have a configuration including, for example, a transfer section including a recording medium transport member (recording medium transport belt) that transports a recording medium and a transfer section that transfers a toner image formed on an image carrier to the recording medium transported by the recording medium transport member. This configuration may include the endless belt according to this exemplary embodiment as the recording medium transport member.

On the other hand, if the endless belt is used as a belt such as a fixing belt (heating belt or pressing belt), the image-forming apparatus according to this exemplary embodiment may be, for example, the following image-forming apparatus.

An example image-forming apparatus includes an image carrier, a charging section that charges a surface of the image carrier, an electrostatic-charge-image forming section that forms an electrostatic charge image on the charged surface of the image carrier, a developing section that develops the electrostatic charge image formed on the surface of the image carrier with a developer containing a toner to form a toner image, a transfer section that transfers the toner image to a recording medium, and a fixing section that fixes the toner image to the recording medium. As the fixing section, a fixing device is used that includes a first rotating member and a second rotating member disposed in contact with an outer surface of the first rotating member. At least one of the first and second rotating members is the endless belt according to this exemplary embodiment.

The image-forming apparatus according to this exemplary embodiment may be, for example, a normal monochrome image-forming apparatus containing only a toner of one color in a developing device, a color image-forming apparatus that sequentially repeats first transfer of a toner image carried on an image carrier to an intermediate transfer member, or a tandem color image-forming apparatus in which multiple image carriers equipped with developing devices of individual colors are arranged in series on an intermediate transfer member.

The image-forming apparatus according to this exemplary embodiment will hereinafter be described with reference to the drawings.

FIG. 1 is a schematic configuration view showing an example of an image-forming apparatus according to this exemplary embodiment. The image-forming apparatus shown in FIG. 1 is an image-forming apparatus including the endless belt according to this exemplary embodiment as an intermediate transfer member (intermediate transfer belt).

As shown in FIG. 1, an image-forming apparatus 100 according to this exemplary embodiment is, for example, a so-called tandem system including four image carriers 101a to 101d composed of electrophotographic photoreceptors and charging devices 102a to 102d, exposure devices 114a to 114d, developing devices 103a to 103d, first transfer devices (first transfer rollers) 105a to 105d, and image-carrier cleaning devices 104a to 104d that are sequentially arranged around the image carriers 101a to 101d, respectively, in the rotational direction thereof. The image-forming apparatus 100 according to this exemplary embodiment may also include erasure devices that remove any residual potential remaining on the surfaces of the image carriers 101a to 101d after transfer.

An intermediate transfer belt 107 is tensioned and supported by support rollers 106a to 106d, a drive roller 111, and a counter roller 108 to form an endless belt unit 107b. The support rollers 106a to 106d, the drive roller 111, and the counter roller 108 allow the intermediate transfer belt 107 to move the image carriers 101a to 101d and the first transfer rollers 105a to 105d in the direction indicated by arrow A while being in contact with the surfaces of the image carriers 101a to 101d. The positions where the first transfer rollers 105a to 105d are in contact with the image carriers 101a to 101d with the intermediate transfer belt 107 therebetween serve as first transfer positions. A first transfer voltage is applied to the contact positions between the image carriers 101a to 101d and the first transfer rollers 105a to 105d.

As a second transfer device, the counter roller 108 and a second transfer roller 109 are disposed opposite each other with the intermediate transfer belt 107 and a second transfer belt 116 therebetween. The second transfer belt 116 is supported by the second transfer roller 109 and a support roller 106e. A recording medium 115 such as paper moves through a region between the intermediate transfer belt 107 and the second transfer roller 109 in the direction indicated by arrow B while being in contact with the surface of the intermediate transfer belt 107 and then passes through a fixing device 110. The position where the second transfer roller 109 is in contact with the counter roller 108 with the intermediate transfer belt 107 and the second transfer belt 116 therebetween serves as a second transfer position. A second transfer voltage is applied to the contact position between the second transfer roller 109 and the counter roller 108. Additionally, intermediate-transfer-belt cleaning devices 112 and 113 are disposed so as to be in contact with the intermediate transfer belt 107 after transfer.

In the multicolor image-forming apparatus 100 having this configuration, as the image carrier 101a rotates in the direction indicated by arrow C, the surface of the image carrier 101a is charged by the charging device 102a, and an electrostatic charge image of a first color is then formed by the exposure device 114a, for example, with laser light. The resulting electrostatic charge image is developed (made visible) by the developing device 103a, which contains a toner corresponding to the color thereof, with a developer containing a toner to form a toner image. The developing devices 103a to 103d contain toners corresponding to electrostatic charge images of individual colors (e.g., yellow, magenta, cyan, and black).

As the toner image formed on the image carrier 101a passes through the first transfer position, the toner image is electrostatically transferred (first transfer) to the intermediate transfer belt 107 by the first transfer roller 105a. Subsequently, toner images of second, third, and fourth colors are subjected to first transfer so as to be sequentially superimposed on top of each other on the intermediate transfer belt 107 carrying the toner image of the first color by the first transfer rollers 105b to 105d. A combined multicolor toner image is finally obtained.

As the combined toner image formed on the intermediate transfer belt 107 passes through the second transfer position, the combined toner image is electrostatically simultaneously transferred to the recording medium 115. The recording medium 115 having the toner image transferred thereto is transported to the fixing device 110, where fixing treatment is performed by heating and pressing, by heating, or by pressing, and is then discharged outside the system.

After first transfer, any residual toner is removed from the image carriers 101a to 101d by the image-carrier cleaning devices 104a to 104d. After second transfer, on the other hand, any residual toner is removed from the intermediate transfer belt 107 by the intermediate-transfer-belt cleaning devices 112 and 113 to prepare for the next image-forming process.

Image Carriers

A wide variety of known electrophotographic photoreceptors may be used as the image carriers 101a to 101d. Examples of electrophotographic photoreceptors that may be used include inorganic photoreceptors, which have photosensitive layers formed of inorganic materials, and organic photoreceptors, which have photosensitive layers formed of organic materials. Suitable organic photoreceptors that may be used include functionally divided organic photoreceptors in which a charge generation layer that generates a charge upon exposure and a charge transport layer that transports the charge are stacked together and single-layer organic photoreceptors having the function of generating a charge and the function of transporting the charge. Suitable inorganic photoreceptors that may be used include those having photosensitive layers formed of amorphous silicon.

The image carriers 101a to 101d may have any shape. For example, known shapes such as cylindrical drum shapes, sheet shapes, and plate shapes may be employed.

Charging Devices

The charging devices 102a to 102d may be any type of charging device. For example, a wide variety of known charging devices may be used as the charging devices 102a to 102d, including contact charging devices having conductive (here, the term "conductive" in connection with charging devices refers to, for example, a volume resistivity of less than $10^7$ Ωcm) or semiconductive (here, the term "semiconductive" in connection with charging devices refers to, for example, a volume resistivity of from $10^7$ Ωcm to $10^{13}$ Ωcm) members such as rollers, brushes, films, and rubber blades and scorotron and corotron charging devices that utilize corona discharge. Among these, contact charging devices are desirable.

Although the charging devices 102a to 102d typically apply a direct current to the image carriers 101a to 101d, the charging devices 102a to 102d may apply a direct current with an alternating current superimposed thereon.

Exposure Devices

The exposure devices 114a to 114d may be any type of exposure device. For example, a wide variety of known exposure devices may be used as the exposure devices 114a to 114d, including optical devices capable of exposing the surfaces of the image carriers 101a to 101d to a predetermined image pattern of light emitted from a light source such as a semiconductor laser, a light-emitting diode (LED), or a liquid crystal shutter or of light directed from such a light source via a polygon mirror.

Developing Devices

The developing devices 103a to 103d may be selected depending on the purpose. For example, known developing devices may be used that develop an image with a one-component developer or a two-component developer with or without contact with a member such as a brush or a roller.

First Transfer Rollers

The first transfer rollers 105a to 105d may have either a single-layer structure or a multilayer structure. For example, if the first transfer rollers 105a to 105d have a single-layer structure, the first transfer rollers 105a to 105d may be composed of a roller formed of a material such as silicone rubber, urethane rubber, or EPDM in foamed or unfoamed form containing an appropriate amount of conductive particles such as carbon black.

Image-Carrier Cleaning Devices

As the image-carrier cleaning devices 104a to 104d, which are intended to remove any residual toner deposited on the surfaces of the image carriers 101a to 101d after the first transfer step, cleaning members such as cleaning blades, cleaning brushes, and cleaning rollers may be used. Among these, it is desirable to use cleaning blades. Examples of materials for cleaning blades include urethane rubber, neoprene rubber, and silicone rubber.

Second Transfer Roller

The second transfer roller 109 may have any layer structure. For example, if the second transfer roller 109 has a three-layer structure, the second transfer roller 109 may be composed of a core layer, an intermediate layer, and a coating layer covering the surface thereof. The core layer is formed of a material such as silicone rubber, urethane rubber, or EPDM in foamed form in which conductive particles are dispersed, whereas the intermediate layer is formed of such a material in unfoamed form. Examples of materials for the coating layer include tetrafluoroethylene-hexafluoropropylene copolymers and perfluoroalkoxy resins. It is desirable that the second transfer roller 109 have a volume resistivity of $10^7$ ΩCM or less. Alternatively, the second transfer roller 109 may have a two-layer structure including no intermediate layer.

Counter Roller

The counter roller 108 forms a counter electrode for the second transfer roller 109. The counter roller 108 may have either a single-layer structure or a multilayer structure. For example, if the counter roller 108 has a single-layer structure, the counter roller 108 may be composed of a roller formed of a material such as silicone rubber, urethane rubber, or EPDM containing an appropriate amount of conductive particles such as carbon black. If the counter roller 108 has a two-layer structure, the counter roller 108 may be composed of a roller including an elastic layer formed of a rubber material as mentioned above and a high-resistivity layer covering the outer peripheral surface thereof.

A voltage of from 1 kV to 6 kV is typically applied to the cores of the counter roller 108 and the second transfer roller 109. The application of the voltage to the core of the counter roller 108 may be replaced by the application of the voltage to an electrode member with good electrical conductivity in contact with the counter roller 108 and the second transfer roller 109. The electrode member may be, for example, a metal roller, a conductive rubber roller, a conductive brush, a metal plate, or a conductive resin plate.

Fixing Device

For example, a wide variety of known fixing devices may be used as the fixing device 110, including heat roller fixing devices, pressing roller fixing devices, and flash fixing devices.

Intermediate-Transfer-Belt Cleaning Devices

As the intermediate-transfer-belt cleaning devices 112 and 113, cleaning members such as cleaning blades, cleaning brushes, and cleaning rollers may be used. Among these, it is desirable to use cleaning blades. Examples of materials for cleaning blades include urethane rubber, neoprene rubber, and silicone rubber.

Next, an image-forming apparatus including the endless belt according to this exemplary embodiment as a recording medium transport member (sheet transport belt) will be described.

Figure 2:
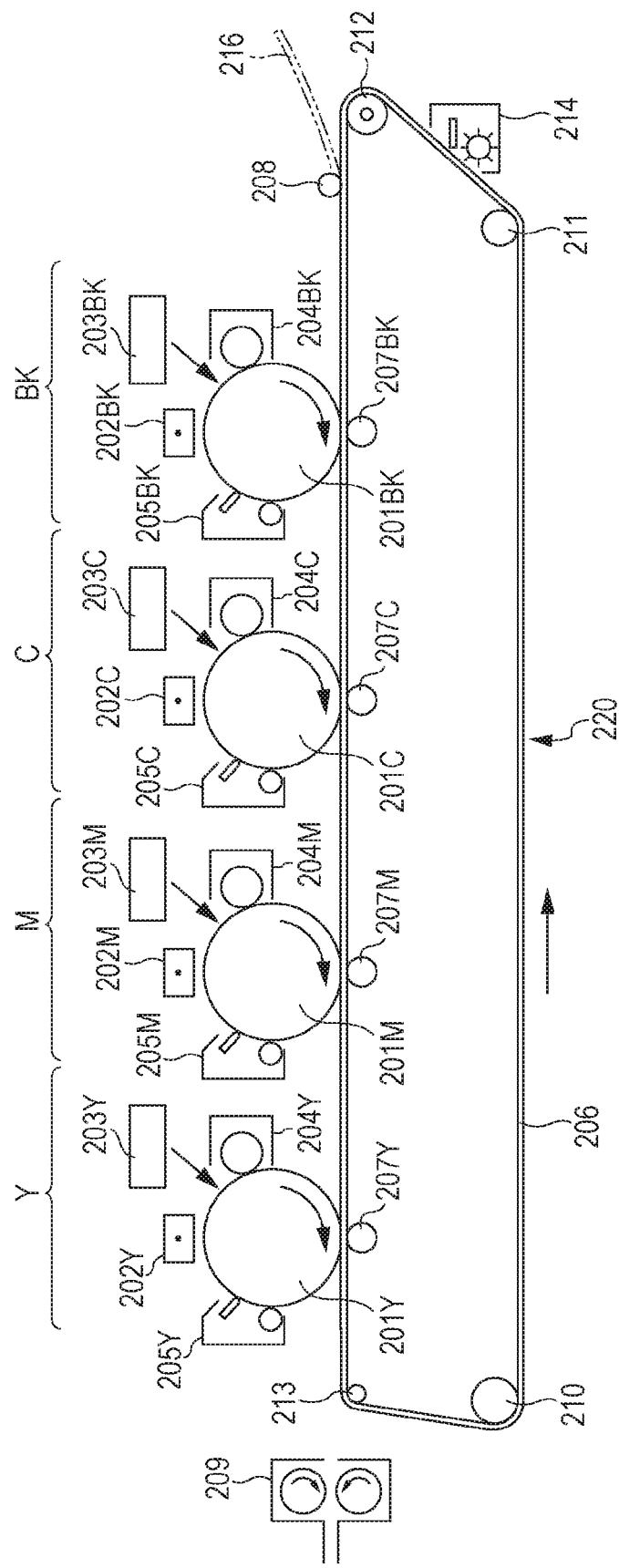
FIG. 2 is a schematic configuration view showing another example of an image-forming apparatus according to this exemplary embodiment.

FIG. 2 is a schematic configuration view showing another example of an image-forming apparatus according to this exemplary embodiment. The image-forming apparatus shown in FIG. 2 is an image-forming apparatus including the endless belt according to this exemplary embodiment as a recording medium transport member (sheet transport belt).

In the image-forming apparatus shown in FIG. 2, units Y, M, C, and BK include photoreceptor drums 201Y, 201M, 201C, and 201BK, respectively, that rotate in the clockwise direction indicated by the arrows. Arranged around the photoreceptor drums 201Y, 201M, 201C, and 201BK are charging devices 202Y, 202M, 202C, and 202BK, exposure devices 203Y, 203M, 203C, and 203BK, developing devices of individual colors (yellow developing device 204Y, magenta developing device 204M, cyan developing device 204C, and black developing device 204BK), and photoreceptor-drum cleaning members 205Y, 205M, 205C, and 205BK, respectively.

The four units Y, M, C, and BK are arranged parallel to each other along a sheet transport belt 206 in the order of the units BK, C, M, and Y. The four units Y, M, C, and BK, however, may be set in any suitable order depending on the method for forming images, such as the order of the units BK, Y, C, and M.

The sheet transport belt 206 is tensioned and supported from inside by belt support rollers 210, 211, 212, and 213 to form an endless belt unit 220. The sheet transport belt 206 rotates in the counterclockwise direction indicated by the arrow at the same peripheral speed as the photoreceptor drums 201Y, 201M, 201C, and 201BK and is disposed such that the portion of the sheet transport belt 206 located between the belt support rollers 212 and 213 is in contact with the photoreceptor drums 201Y, 201M, 201C, and 201BK. The sheet transport belt 206 is equipped with a belt cleaning member 214.

Transfer rollers 207Y, 207M, 207C, and 207BK are disposed inside the sheet transport belt 206 at positions opposite the portions of the sheet transport belt 206 in contact with the photoreceptor drums 201Y, 201M, 201C, and 201BK, respectively, to form transfer regions where toner images are transferred to a sheet (transfer medium) 216 via the photoreceptor drums 201Y, 201M, 201C, and 201BK and the sheet transport belt 206. The transfer rollers 207Y, 207M, 207C, and 207BK may be located at positions directly below the photoreceptor drums 201Y, 201M, 201C, and 201BK, as shown in FIG. 2, or may be shifted from the positions directly therebelow.

A fixing device 209 is disposed such that the sheet 216 is transported to the fixing device 209 after passing through the transfer regions between the sheet transport belt 206 and the photoreceptor drums 201Y, 201M, 201C, and 201BK.

A sheet transport roller 208 transports the sheet 216 to the sheet transport belt 206.

In the image-forming apparatus shown in FIG. 2, the photoreceptor drum 201BK in the unit BK is driven to rotate. In synchronization with this, the charging device 202BK is driven to charge the surface of the photoreceptor drum 201BK to the target polarity and potential. The charged surface of the photoreceptor drum 201BK is then exposed to an image pattern of light by the exposure device 203BK to form an electrostatic charge image on the surface thereof.

The electrostatic charge image is then developed by the black developing device 204BK. As a result, a toner image is formed on the surface of the photoreceptor drum 201BK. The developer used herein may be a one-component developer or a two-component developer.

This toner image passes through the transfer region between the photoreceptor drum 201BK and the sheet transport belt 206. The sheet 216 is electrostatically attracted to the sheet transport belt 206 and is transported to the transfer region, where the toner image is sequentially transferred to the surface of the sheet 216 by an electric field formed by a transfer bias applied by the transfer roller 207BK.

Thereafter, any toner remaining on the photoreceptor drum 201BK is removed by cleaning with the photoreceptor-drum cleaning member 205BK. The photoreceptor drum 201BK is then subjected to the next image transfer.

The foregoing image transfer is also performed in the units C, M, and Y in the manner described above.

The sheet 216 having toner images transferred thereto by the transfer rollers 207BK, 207C, 207M, and 207Y is further transported to the fixing device 209, where fixing is performed.

Thus, the target image is formed on the sheet 216.

Next, an image-forming apparatus including the endless belt according to this exemplary embodiment as a fixing belt (heating belt or pressing belt) will be described.

The image-forming apparatus including the endless belt according to this exemplary embodiment as a fixing belt (heating belt or pressing belt) may be, for example, an image-forming apparatus similar to the image-forming apparatuses shown in FIGS. 1 and 2. In the image-forming apparatuses shown in FIGS. 1 and 2, for example, a fixing device, as described later, that includes the endless belt according to this exemplary embodiment is used as the fixing device 110 or the fixing device 209.

A fixing device including the endless belt according to this exemplary embodiment as a fixing belt (heating belt or pressing belt) will hereinafter be described.

Fixing Device

The fixing device may have various configurations. For example, the fixing device includes a first rotating member and a second rotating member disposed in contact with an outer surface of the first rotating member. A fixing member is used as at least one of the first and second rotating members.

As a first form of fixing device, a fixing device including a heating roller and a pressing belt will hereinafter be described, and, as a second form of fixing device, a fixing device including a heating belt and a pressing roller will hereinafter be described.

The fixing device is not limited to the first and second forms, but may be a fixing device including a heating belt and a pressing belt. The endless belt according to this exemplary embodiment may be used either as a heating belt or as a pressing belt.

In addition, the fixing device is not limited to the first and second forms, but may be a fixing device having an electromagnetic induction heating system.

First Form of Fixing Device

Figure 3:
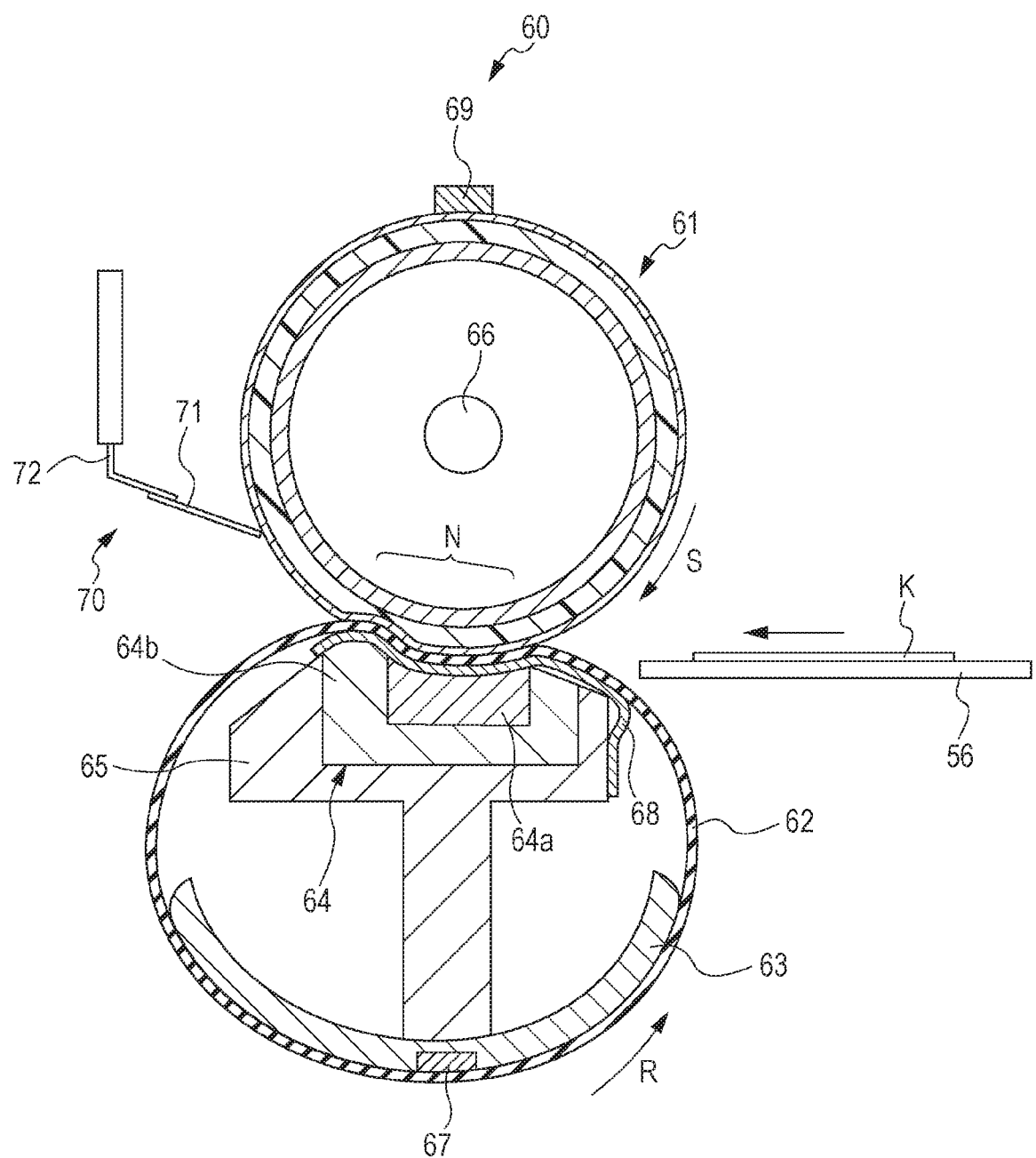
FIG. 3 is a schematic configuration view showing an example of a fixing device according to a first form.

A fixing device according to the first form will now be described. FIG. 3 is a schematic view showing an example of a fixing device according to the first form.

As shown in FIG. 3, a fixing device 60 according to the first form includes, for example, a heating roller 61 (an example of a first rotating member) that is driven to rotate, a pressing belt 62 (an example of a second rotating member), and a pressing pad 64 (an example of a pressing member) that presses the heating roller 61 with the pressing belt 62 therebetween.

For example, the pressing pad 64 may be configured such that the pressing belt 62 and the heating roller 61 are pressed relative to each other. Thus, the pressing belt 62 may be pressed by the heating roller 61, or the heating roller 61 may be pressed by the pressing belt 62.

A halogen lamp 66 (an example of a heating section) is disposed inside the heating roller 61. The heating section is not limited to a halogen lamp, but may be another heating member that generates heat.

On the other hand, for example, a thermosensor 69 is disposed in contact with the surface of the heating roller 61. The halogen lamp 66 is turned on and off based on the temperature measured with the thermosensor 69 to maintain the surface temperature of the heating roller 61 at the target preset temperature (e.g., 150° C.)

For example, the pressing belt 62 is rotatably supported by the pressing pad 64 and a belt running guide 63, which are disposed inside the pressing belt 62. The pressing belt 62 is disposed so as to be pressed against the heating roller 61 by the pressing pad 64 in a nip region N (nip).

For example, the pressing pad 64 is disposed inside the pressing belt 62 so as to be pressed against the heating roller 61 with the pressing belt 62 therebetween to form the nip region N between the pressing pad 64 and the heating roller 61.

The pressing pad 64 includes, for example, a front nip member 64*a* that is disposed at the entry side of the nip region N and that ensures a wide nip region N and a stripping nip member 64*b* that is disposed at the exit side of the nip region N and that deforms the heating roller 61.

To reduce the sliding resistance between the inner peripheral surface of the pressing belt 62 and the pressing pad 64, for example, a sheet-shaped sliding member 68 is disposed on the surfaces of the front nip member 64*a* and the stripping nip member 64*b* in contact with the pressing belt 62. The pressing pad 64 and the sliding member 68 are held by a metal holding member 65.

For example, the sliding member 68 is disposed such that the sliding surface thereof is in contact with the inner peripheral surface of the pressing belt 62, thereby contributing to retention and supply of oil present between the sliding member 68 and the pressing belt 62.

For example, the holding member 65 is equipped with the belt running guide 63 so that the pressing belt 62 is rotatable.

For example, the heating roller 61 is rotated by a drive motor (not shown) in the direction indicated by arrow S, and with this rotation, the pressing belt 62 is rotated in the direction indicated by arrow R, which is opposite to the rotational direction of the heating roller 61. That is, for example, whereas the heating roller 61 is rotated in the clockwise direction in FIG. 3, the pressing belt 62 is rotated in the counterclockwise direction.

For example, a sheet K (an example of a recording medium) having an unfixed toner image thereon is guided by a fixing entry guide 56 and is transported to the nip region N. As the sheet K passes through the nip region N, the toner image on the sheet K is fixed by pressure and heat applied to the nip region N.

In the fixing device 60 according to the first form, for example, the front nip member 64*a*, which has a concave shape conforming to the outer peripheral surface of the heating roller 61, ensures a wider nip region N than in a configuration including no front nip member 64*a*.

In addition, in the fixing device 60 according to the first form, for example, the stripping nip member 64*b* is disposed so as to protrude against the outer peripheral surface of the heating roller 61 so that the heating roller 61 is locally more deformed in the exit region of the nip region N.

If the stripping nip member 64*b* is disposed in this way, for example, as the sheet K after fixing passes through the stripping nip region, the sheet K passes through the locally more deformed region, so that the sheet K may be easily stripped from the heating roller 61.

As a stripping assistance section, for example, a stripping member 70 is disposed downstream of the nip region N of the heating roller 61. The stripping member 70 includes, for example, a stripping nail 71 held near the heating roller 61 by a holding member 72 in a direction opposite to the rotational direction of the heating roller 61 (counter direction).

Second Form of Fixing Device

Figure 4:
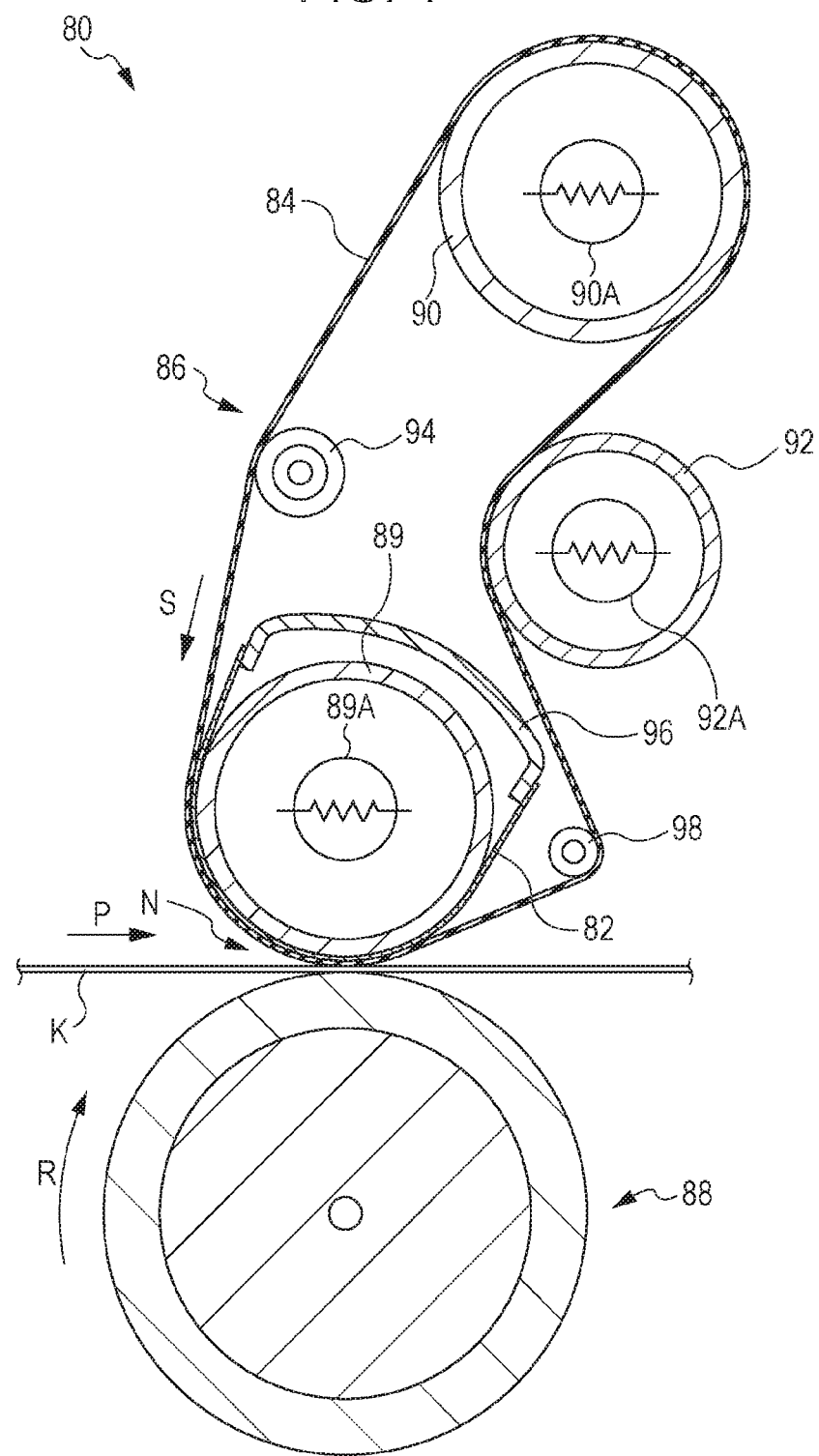
FIG. 4 is a schematic configuration view showing an example of a fixing device according to a second form.

A fixing device according to the second form will now be described. FIG. 4 is a schematic view showing an example of a fixing device according to the second form.

As shown in FIG. 4, a fixing device 80 according to the second form includes, for example, a fixing belt module 86 including a heating belt 84 (an example of a first rotating member) and a pressing roller 88 (an example of a second rotating member) disposed so as to be pressed against the heating belt 84 (fixing belt module 86). For example, a nip region N (nip) where the heating belt 84 (fixing belt module 86) is in contact with the pressing roller 88 is formed. In the nip region N, a toner image is fixed to a sheet K (an example of a recording medium) by pressing and heating.

The fixing belt module 86 includes, for example, the endless heating belt 84, a heating and pressing roller 89 around which the heating belt 84 is looped on the pressing roller 88 side and that is driven to rotate by the rotational force of a motor (not shown) while pressing the heating belt 84 from the inner peripheral surface thereof toward the pressing roller 88 side, and a support roller 90 that supports the heating belt 84 from inside at a different position from the heating and pressing roller 89.

The fixing belt module 86 includes, for example, a support roller 92 disposed outside the heating belt 84 and defining the circulating path thereof, an orientation-correcting roller 94 that corrects the orientation of the heating belt 84 between the heating and pressing roller 89 and the support roller 90, and a support roller 98 that tensions the heating belt 84 from the inner peripheral surface thereof downstream of the nip region N, which is the region where the heating belt 84 (fixing belt module 86) is in contact with the pressing roller 88.

For example, the fixing belt module 86 is provided such that a sheet-shaped sliding member 82 is disposed between the heating belt 84 and the heating and pressing roller 89.

For example, the sliding member 82 is disposed such that the sliding surface thereof is in contact with the inner peripheral surface of the heating belt 84, thereby contributing to retention and supply of oil present between the sliding member 82 and the heating belt 84.

Here, for example, the sliding member 82 is disposed such that both ends thereof are supported by a support member 96.

For example, a halogen heater 89A (an example of a heating section) is disposed inside the heating and pressing roller 89.

For example, the support roller 90 is a cylindrical roller formed of aluminum, and a halogen heater 90A (an example of a heating section) is disposed inside the support roller 90 so as to heat the heating belt 84 from the inner peripheral surface thereof.

For example, spring members (not shown) that press the heating belt 84 outward are disposed at both ends of the support roller 90.

For example, the support roller 92 is a cylindrical roller formed of aluminum, and a release layer formed of a fluorocarbon resin and having a thickness of 20 μm is formed on the surface of the support roller 92.

For example, the release layer of the support roller 92 is formed to prevent the deposition of any toner or paper powder coming from the outer peripheral surface of the heating belt 84 onto the support roller 92.

For example, a halogen heater 92A (an example of a heating source) is disposed inside the support roller 92 so as to heat the heating belt 84 from the outer peripheral surface thereof.

That is, for example, the heating and pressing roller 89, the support roller 90, and the support roller 92 are configured to heat the heating belt 84.

For example, the orientation-correcting roller 94 is a cylindrical roller formed of aluminum, and an end-position measuring mechanism (not shown) that measures the end position of the heating belt 84 is disposed near the orientation-correcting roller 94.

For example, the orientation-correcting roller 94 is equipped with an axial displacement mechanism (not shown) that displaces the abutment position of the heating belt 84 in the axial direction depending on the measurement results from the end-position measuring mechanism, thereby controlling the meandering of the heating belt 84.

On the other hand, for example, the pressing roller 88 is rotatably supported and is disposed so as to be pressed against the portion of the heating belt 84 looped around the heating and pressing roller 89 by an urging section such as a spring (not shown). Thus, as the heating belt 84 (heating and pressing roller 89) of the fixing belt module 86 is rotated and moved in the direction indicated by arrow S, the pressing roller 88 is rotated and moved in the direction indicated by arrow R with the rotation of the heating belt 84 (heating and pressing roller 89).

A sheet K having an unfixed toner image (not shown) thereon is transported in the direction indicated by arrow P and is guided to the nip region N of the fixing device 80, where the toner image is fixed by pressure and heat applied to the nip region N.

Although the fixing device 80 according to the second form has been described as having halogen heaters (halogen lamps) as an example of a heating source, the heating source is not limited thereto, but may be a heating source other than halogen heaters, such as a radiant lamp heating element (a heating element that emits radiation (e.g., infrared radiation) or a resistance heating element (a heating element that generates Joule heat as a current flows through a resistor, e.g., a ceramic substrate having a resistive film formed and fired thereon).

Endless Belt Unit

An endless belt unit according to this exemplary embodiment may be an endless belt unit including the endless belt according to this exemplary embodiment and multiple rollers around which the endless belt is looped under tension.

The endless belt unit according to this exemplary embodiment includes, for example, a cylindrical member and multiple rollers around which the cylindrical member is looped under tension, as exemplified by the endless belt unit 107b shown in FIG. 1 and the endless belt unit 220 shown in FIG. 2.

Figure 5:
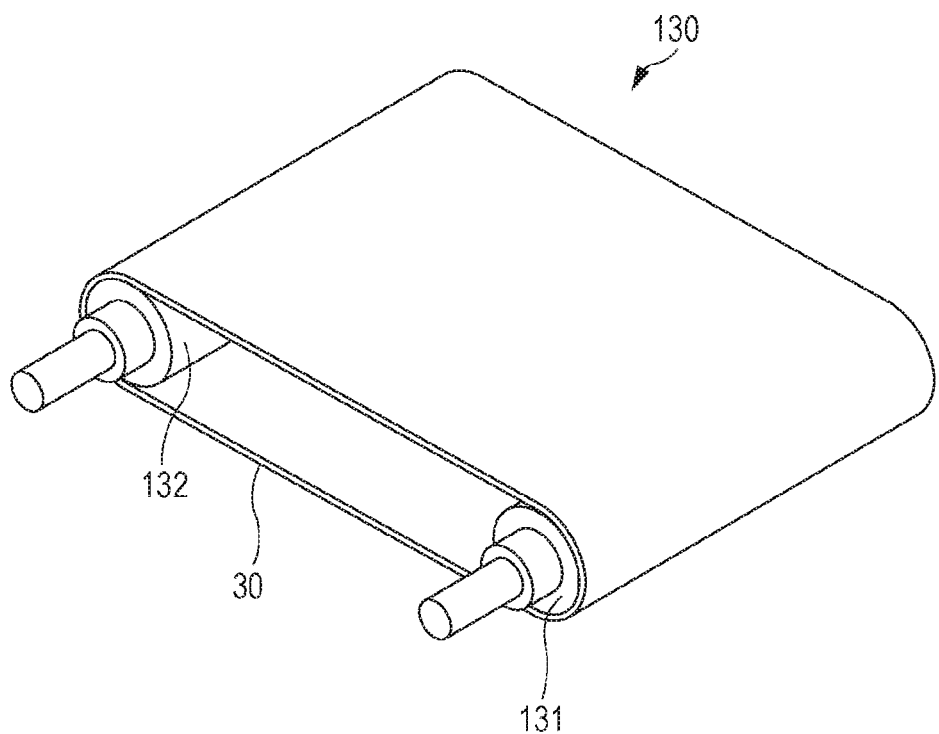
FIG. 5 is a schematic perspective view showing an example of an endless belt unit according to this exemplary embodiment.

For example, an example of an endless belt unit according to this exemplary embodiment may be an endless belt unit shown in FIG. 5.

FIG. 5 is a schematic perspective view showing the endless belt unit according to this exemplary embodiment.

As shown in FIG. 5, an endless belt unit 130 according to this exemplary embodiment includes an endless belt 30 according to this exemplary embodiment as described above. For example, the endless belt 30 is looped under tension around a drive roller 131 and a driven roller 132 that are disposed opposite each other.

Here, if the endless belt 30 of the endless belt unit 130 according to this exemplary embodiment is used as an intermediate transfer member, a roller for first transfer of a toner image on the surface of a photoreceptor (image carrier) to the endless belt 30 and a roller for second transfer of the toner image transferred to the endless belt 30 further to a recording medium may be provided as rollers that support the endless belt 30.

Any number of rollers that support the endless belt 30 may be provided depending on the manner of use. The endless belt unit 130 having the above configuration is installed and used in an apparatus, and the endless belt 30 is supported and rotated with the rotation of the drive roller 131 and the driven roller 132.

Polyimide Resin Molded Product

Endless belts, image-forming apparatuses, and endless belt units have been described above. In addition to these, with the reduced susceptibility to breakage of the endless belt according to this exemplary embodiment, a polyimide resin molded product including the polyimide resin layer described above may be provided.

Specifically, a polyimide resin molded product according to this exemplary embodiment includes a polyimide resin layer containing a polyimide resin containing two or more components derived from tetracarboxylic dianhydrides and/or two or more components derived from diamine compounds; and at least one solvent selected from a solvent group A consisting of urea-based solvents, alkoxy-group-containing amide-based solvents, and ester-group-containing amide-based solvents in an amount of from 50 ppm to 2,000 ppm or from about 50 ppm to about 2,000 ppm.

The polyimide resin layer of the polyimide resin molded product may optionally contain the conductive particles described above and other additives.

The polyimide resin present in the polyimide resin layer of the polyimide resin molded product is a polyimide resin similar to the polyimide resin described for the endless belt discussed above. In addition, the polyimide resin and the solvent group A present in the polyimide resin layer of the polyimide resin molded product may be analyzed in the same manner as described for the endless belt discussed above. Furthermore, as described for the endless belt, the content of at least one solvent selected from the solvent group A refers to the total amount of solvents selected from the solvent group A and is the content based on the total amount of the polyimide resin layer.

As the polyimide resin molded product according to this exemplary embodiment, the polyimide resin molded product may be directly used as a single-layer product to provide a polyimide resin molded product including a polyimide resin layer. Alternatively, the polyimide resin molded product may be used as a multilayer product including another layer on at least one surface of the polyimide resin molded product to provide a polyimide resin molded product including a polyimide resin layer.

The polyimide resin molded product according to this exemplary embodiment may be prepared, for example, using the polyimide precursor composition discussed above as a coating solution for forming a polyimide resin molded product by applying the coating solution for forming a polyimide resin molded product to a substrate and then subjecting the coating to heating treatment.

The polyimide resin molded product may be used in any application. Examples of applications of the polyimide resin molded product include flexible electronic substrate films, copper clad laminate films, laminate films, electrically insulating films, porous films for fuel cells, and separation films. Other examples include heat-resistant films, IC packages, adhesive films, liquid crystal alignment films, resist films, planarizing films, microlens array films, electric wire covering films, and optical fiber covering films. When used in these applications, the polyimide resin molded product according to this exemplary embodiment may have a reduced susceptibility to breakage.

EXAMPLES

Examples will hereinafter be described, although these examples are not intended to limit the present invention in any way. In the following description, all parts and percentages are by weight unless otherwise specified.

Synthesis Example 1

Preparation of Polyimide Precursor Composition (A-1)
A flask equipped with a stir bar and a thermometer is charged with 200 g of 1,3-dimethyl-2-imidazolidinone (DMI). To the flask is added 18 g of 4,4'-diaminodiphenyl ether (ODA), and the mixture is dispersed with stirring at 20° C. for 10 minutes. To this solution is added 26 g of 3,3',4,4'-biphenyltetracarboxylic dianhydride (BPDA), and the mixture is dissolved and reacted with stirring for 24 hours while a reaction temperature of 50° C. is maintained. Polyimide Precursor Composition (A-1) containing a polyimide precursor is obtained.

Synthesis Example 2

Preparation of Polyimide Precursor Composition (A-2)
A flask equipped with a stir bar and a thermometer is charged with 200 g of tetramethylurea. To the flask is added 12.5 g of 4,4'-diaminodiphenyl ether (ODA) and then 2.9 g of p-phenylenediamine (PDA), and the mixture is dispersed with stirring at 20° C. for 10 minutes. To this solution is added 25.7 g of 3,3',4,4'-biphenyltetracarboxylic dianhydride (BPDA), and the mixture is dissolved and reacted with stirring for 24 hours while a reaction temperature of 50° C. is maintained. Polyimide Precursor Composition (A-2) containing a polyimide precursor is obtained.

Synthesis Examples 3 to 24

Preparation of Polyimide Precursor Compositions (A-3) to (A-24)
Polyimide Precursor Compositions (A-3) to (A-24) are obtained by the same procedure as in Synthesis Example 2 except that the solvent and the monomers are changed as shown in Table 1. In Table 1, "ODPA" refers to 4,4'-oxydiphthalic dianhydride.

TABLE 1

| Synthesis example | PI precursor | Solvent group A | Diamine compound (g) | | Tetracarboxylic dianhydride (g) | |
|---|---|---|---|---|---|---|
| | | | ODA | PDA | BPDA | ODPA |
| 1 | A-1 | DMI | 18 | — | 26 | — |
| 2 | A-2 | TMU | 12.5 | 2.9 | 25.7 | — |
| 3 | A-3 | TEU | 12.5 | 2.9 | 25.7 | — |
| 4 | A-4 | DMI | 12.5 | 2.9 | 25.7 | — |
| 5 | A-5 | DMPU | 12.5 | 2.9 | 25.7 | — |
| 6 | A-6 | B-4 | 12.5 | 2.9 | 25.7 | — |
| 7 | A-7 | B-7 | 12.5 | 2.9 | 25.7 | — |
| 8 | A-8 | C-3 | 12.5 | 2.9 | 25.7 | — |
| 9 | A-9 | DMI | 17.5 | 1.1 | 28.1 | — |
| 10 | A-10 | DMI | 9.6 | 5.2 | 27.7 | — |
| 11 | A-11 | DMI | — | 11.5 | 30.7 | — |
| 12 | A-12 | TMU | 2 | 9.5 | 28.2 | — |
| 13 | A-13 | TEU | 2 | 9.5 | 28.2 | — |
| 14 | A-14 | DMI | 2 | 9.5 | 28.2 | — |
| 15 | A-15 | DMPU | 2 | 9.5 | 28.2 | — |
| 16 | A-16 | B-4 | 2 | 9.5 | 28.2 | — |
| 17 | A-17 | B-7 | 2 | 9.5 | 28.2 | — |
| 18 | A-18 | C-3 | 2 | 9.5 | 28.2 | — |
| 19 | A-19 | DMI | 0.7 | 12.1 | 33.3 | — |
| 20 | A-20 | DMI | 6.4 | 7.5 | 29.2 | — |
| 21 | A-21 | DMI | 12.5 | 2.9 | — | 27.4 |
| 22 | A-22 | DMI | 18 | — | 20.8 | 5.5 |
| 23 | A-23 | DMI | 12.5 | 2.9 | 20.8 | 5.5 |
| 24 | A-24 | DMI | 0.7 | 12.1 | 20.8 | 5.5 |

Example 1

Film Formation

Carbon black (SPECIAL Black 4, manufactured by Orion Engineered Carbons) is fed to a mixture of Polyimide Precursor Compositions (A-1) and (A-11) in a weight ratio of (A-1)/(A-11)=70/30 in an amount of 4% by weight, on a solid weight basis, based on the total weight of the polyimide precursors present in the mixture of Polyimide Precursor Compositions (A-1) and (A-11). The mixture is subjected to dispersion treatment (200 N/mm$^2$, 5 passes) in a jet mill disperser (Geanus PY, manufactured by Geanus) to obtain a carbon-black-dispersed polyimide precursor composition.

The resulting carbon-black-dispersed polyimide precursor composition is passed through a 20 μm stainless steel mesh to remove foreign substances and carbon black aggregates. The carbon-black-dispersed polyimide precursor composition is then vacuum-degassed with stirring for 15 minutes to prepare a coating solution for forming an endless belt.

The thus-prepared coating solution for forming an endless belt is applied to the outer surface of an aluminum cylindrical mold (substrate), and the mold is dried at 150° C. for 30 minutes while being rotated. The mold is then dried in an oven at 325° C. for 1 hour while being rotated at 20 rpm and is then removed from the oven. A polyimide resin molded product formed on the outer peripheral surface of the mold is removed from the mold to obtain an endless belt including a polyimide resin layer having a thickness of 0.08 mm.

Measurement of Residual Solvent Content

The amount of residual solvent (content) is measured by pyrolysis gas chromatography-mass spectrometry (GC-MS) in the manner described above. The measured residual solvent content is 450 ppm (by weight).

Storage Test

Figure 6:
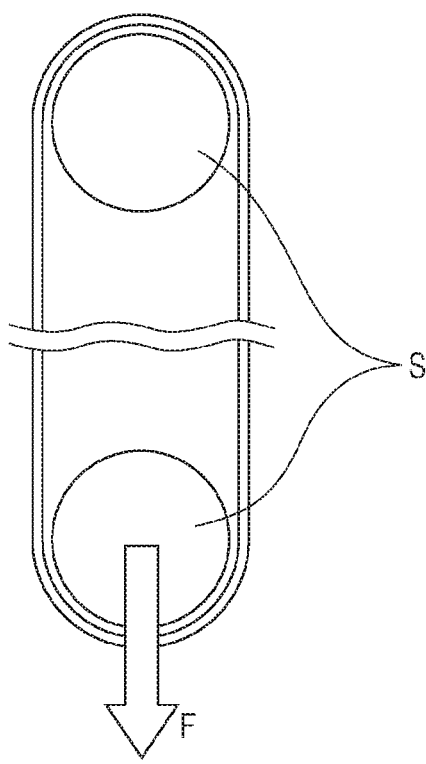
FIG. 6 is a schematic view illustrating a storage test for endless belts in the Examples.

Two shafts S with a diameter of 5 mm are mounted inside the resulting endless belt. A storage test is carried out in which the endless belt is suspended with a load F of 5 kg placed on one shaft and is allowed to stand in this state at 10° C. and 30% RH for 1 week. Thereafter, the two shafts are removed, and the endless belt is allowed to stand at 23° C. and 50% RH for 1 hour and 24 hours. The external appearance is then visually inspected (see FIG. 6).

Rating Scale

A: Almost no change in shape is observed after standing for 1 hour or 24 hours.

B: A change in shape is observed in a portion (50% or less) of the region brought into contact with the shaft after standing for 1 hour, but almost no change in shape is observed after standing for 24 hours.

C: A change in shape is observed in a portion (50% or less) of the region brought into contact with the shaft after standing for 24 hours.

D: A change in shape is observed in the entire region brought into contact with the shaft after standing for 24 hours.

Cleanability Test

The resulting endless belt is installed in a Fuji Xerox Apeos Port-II C4300. After an untransferred image with an image density of 100% is formed on three sheets of A3 paper in the longitudinal direction, any toner remaining on the endless belt without being cleaned off is taken with a tape, and cleanability is visually rated.

Rating Scale

A: No streak is visually observed.

B: From one to five streaks are visually observed. Thereafter, recovery is achieved within five normal prints.

C: Six or more streaks are visually observed. Thereafter, recovery is achieved within five normal prints.

D: Six or more streaks are visually observed. Thereafter, recovery is not achieved within five normal prints.

Print Test

As in the cleaning test, the resulting endless belt is installed in a Fuji Xerox Apeos Port-II C4300, and a print test is carried out at 10° C. and 30% RH.

Rating Scale

In the axial direction of the portion brought into contact with the shaft in the storage test, A: the image is not faint.

B: the image appears faint in less than 5% of the region thereof.

C: the image appears faint in from 5% to less than 50% of the region thereof.

D: the image appears faint in 50% or more of the region thereof.

Durability Test

As in the cleaning test, the resulting endless belt is installed in a Fuji Xerox Apeos Port-II C4300, and a print test is carried out at 10° C. and 30% RH, with the drive shaft for belt driving in the Apeos Port-II C4300 being tilted by 300 μm on the left and right.

Rating Scale

Upon completion of 10,000 prints, a determination is made on the following scale:

A: There is no faint image, unusual sound, or belt breakage.

B: A normally unnoticeable level of unusual sound occurs.

C: Unusual sound occurs.

D: Belt breakage occurs before completion of 10,000 prints.

Examples 2 to 17 and Comparative Examples 1 to 4

Polyimide precursor compositions and endless belts are fabricated as in Example 1 except that the types and combination of polyimide precursor compositions are changed and the solvent content is adjusted as shown in Table 2, and are rated as described above.

TABLE 2

| | PI precursor 1 | | PI precursor 2 | | Solvent content (ppm) | Visual inspection of shape after storage | Cleaning test | Print test | Durability test | Overall rating |
|---|---|---|---|---|---|---|---|---|---|---|
| | Type | Proportion | Type | Proportion | | | | | | |
| Example 1 | A-1 | 70 | A-11 | 30 | 450 | A | A | B | A | A (Excellent) |
| Example 2 | A-1 | 90 | A-11 | 10 | 570 | A | A | A | B | A (Excellent) |
| Example 3 | A-2 | 100 | — | — | 380 | A | A | B | A | A (Excellent) |

TABLE 2-continued

|  | PI precursor 1 | | PI precursor 2 | | Solvent content (ppm) | Visual inspection of shape after storage | Cleaning test | Print test | Durability test | Overall rating |
|---|---|---|---|---|---|---|---|---|---|---|
|  | Type | Proportion | Type | Proportion | | | | | | |
| Example 4 | A-3 | 100 | — | — | 600 | A | A | B | A | A (Excellent) |
| Example 5 | A-4 | 100 | — | — | 510 | A | A | A | A | A (Excellent) |
| Example 6 | A-5 | 100 | — | — | 490 | A | B | A | A | A (Excellent) |
| Example 7 | A-6 | 100 | — | — | 530 | A | B | A | A | A (Excellent) |
| Example 8 | A-7 | 100 | — | — | 560 | A | B | A | A | A (Excellent) |
| Example 9 | A-8 | 100 | — | — | 480 | A | B | B | A | B (Good) |
| Example 10 | A-9 | 100 | — | — | 520 | B | B | A | A | B (Good) |
| Example 11 | A-10 | 100 | — | — | 570 | A | B | B | B | B (Good) |
| Example 12 | A-1 | 70 | A-11 | 30 | 50 | B | A | B | A | B (Good) |
| Example 13 | A-1 | 70 | A-11 | 30 | 2000 | A | B | B | A | B (Good) |
| Example 14 | A-1 | 70 | A-21 | 30 | 600 | B | A | B | A | B (Good) |
| Example 15 | A-11 | 70 | A-22 | 30 | 570 | A | B | B | B | B (Good) |
| Example 16 | A-22 | 100 | — | — | 500 | A | B | B | A | B (Good) |
| Example 17 | A-23 | 100 | — | — | 490 | B | A | B | A | B (Good) |
| Comparative Example 1 | A-1 | 70 | A-11 | 30 | 35 | C | C | B | C | D (Poor) |
| Comparative Example 2 | A-1 | 70 | A-11 | 30 | 2200 | C | C | B | C | D (Poor) |
| Comparative Example 3 | A-1 | 100 | — | — | 450 | C | D | B | C | D (Poor) |
| Comparative Example 4 | A-1 | 100 | — | — | 40 | D | D | D | D | D (Poor) |

Example 18

Film Formation

The surface of an aluminum cylindrical mold (substrate) is roughened by blasting treatment, and a silicone release agent (the trade name KS-700, manufactured by Shin-Etsu Chemical Co., Ltd.) is applied to the outer peripheral surface of the mold and is subjected to baking treatment at 300° C. for 1 hour to provide a mold having a surface roughness Ra of 0.8 µm and having the silicone release agent baked on the surface thereof. Polyimide Precursor Composition (A-12) adjusted to a viscosity of 120 Pa·s is then applied to a region with a length of 470 mm in the center of the thus-provided mold by a flow coating (spiral coating) process. The coating solution is then dried while the mold is rotated at 100° C. for 50 minutes. A smoothed polyimide precursor coating is obtained.

Next, a fluorocarbon resin (PFA) dispersion (the trade name 710CL, manufactured by Du Pont-Mitsui Fluorochemicals Co., Ltd.) to which carbon black (Ketjen black dispersion, manufactured by Lion Corporation) is added in an amount of 2% by weight on a solid basis is then applied to the polyimide precursor coating by a spray coating process. Thereafter, the mold is heated to 380° C. over 150 minutes and is then held at that temperature for 40 minutes while being rotated at 30 rpm to fire the coating. After cooling to room temperature (25° C.), the fired coating (film) is removed from the mold to obtain an endless belt including a polyimide resin layer. This endless belt includes a PFA layer with a thickness of 30 µm formed on the outer peripheral surface of a polyimide resin molded product with a thickness of 70 µm.

Measurement of Residual Solvent Content

The amount of residual solvent (content) is measured by GC-MS in the manner described above. The measured residual solvent content is 680 ppm (by weight).

Storage Test

A storage test is carried out as in Example 1.

Sheet Transportability Test

Figure 7:
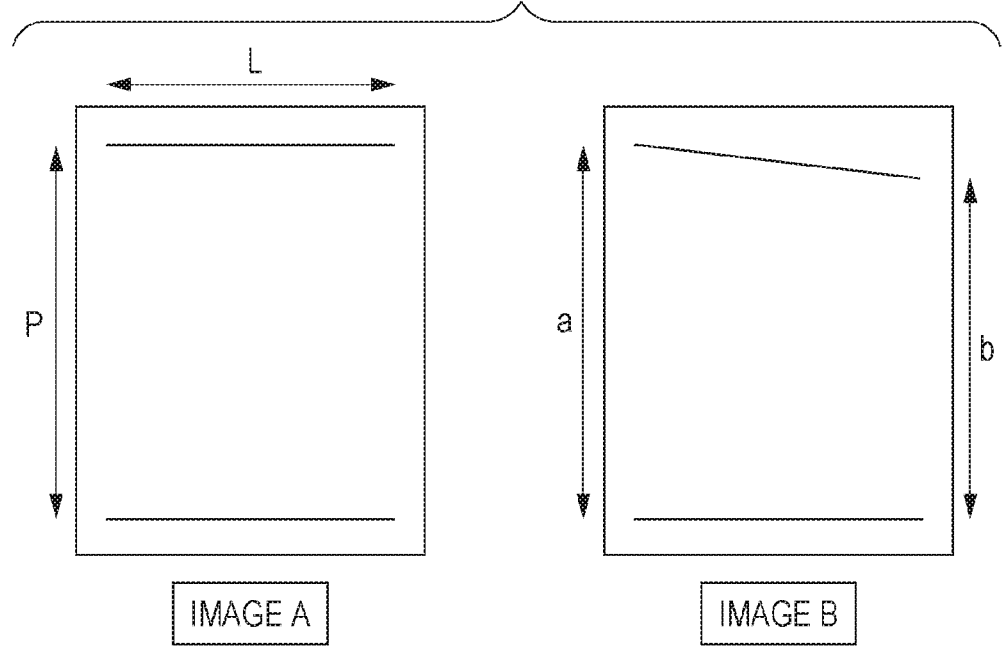
FIG. 7 is a schematic view illustrating a sheet transportability test for endless belts in the Examples.

The resulting endless belt is installed in a Fuji Xerox Apeos Port-II C4300. An image A in which two one-dot lines are formed with a spacing P of 370 mm in the longitudinal direction of A3 paper and a length L of 250 mm in the lateral direction of A3 paper is output in the longitudinal direction of A3 paper in an environment at 10° C. and 30% RH. In the output image B, the maximum spacing a of the two one-dot lines and the minimum spacing b of the two one-dot lines are measured, and the difference between a and b is calculated. Sheet transportability is rated on the following rating scale (see FIG. 7).

Rating Scale

A: a and b are 370±0.5 mm, and the difference between a and b is less than 1 mm.

B: The difference between a and b is less than 1 mm.

C: The difference between a and b is from 1 mm to less than 1.5 mm.

D: The difference between a and b is 1.5 mm or more.

Print Test 1

As in the cleaning test, the resulting endless belt is installed in a Fuji Xerox Apeos Port-II C4300, and a print test is carried out in an environment at 10° C. and 40% RH.

Rating Scale

In the axial direction of the portion brought into contact with the shaft in the storage test, A: the image is not faint.

B: the image appears faint in less than 5% of the region thereof.

C: the image appears faint in from 5% to less than 10% of the region thereof.

D: the image appears faint in 10% or more of the region thereof.

Print Test 2

As in the cleaning test, the resulting endless belt is installed in a Fuji Xerox Apeos Port-II C4300, and a duplex print test is carried out on 100 sheets of paper in an environment at 30° C. and 90% RH.

Rating Scale
- A: There is no paper crease.
- B: Paper creases are slightly visible through a magnifying glass. A level acceptable for practical use.
- C: Paper creases are slightly visible to the naked eye. A level at which problems would occur in markets where image quality requirements are strict.
- D: Paper creases are clearly visible to the naked eye. An unacceptable level.

Examples 19 to 27 and Comparative Examples 5 to 7

Polyimide precursor compositions and endless belts are fabricated as in Example 13 except that the type of solvent is changed, the solvent content is adjusted as shown in Table 3, and the types and combination of polyimide precursor compositions are changed, and are rated as described above.

TABLE 3

| | PI precursor 1 | | PI precursor 2 | | Solvent content (ppm) | Visual inspection of shape after storage | Sheet transportability test | Print test 1 | Print test 2 | Overall rating |
|---|---|---|---|---|---|---|---|---|---|---|
| | Type | Proportion | Type | Proportion | | | | | | |
| Example 18 | A-12 | 100 | — | — | 680 | A | A | B | A | A (Excellent) |
| Example 19 | A-13 | 100 | — | — | 710 | A | A | B | A | A (Excellent) |
| Example 20 | A-14 | 100 | — | — | 620 | A | A | A | A | A (Excellent) |
| Example 21 | A-15 | 100 | — | — | 590 | A | A | A | B | A (Excellent) |
| Example 22 | A-16 | 100 | — | — | 740 | A | B | A | A | A (Excellent) |
| Example 23 | A-17 | 100 | — | — | 700 | A | B | A | A | A (Excellent) |
| Example 24 | A-18 | 100 | — | — | 620 | A | B | A | B | B (Good) |
| Example 25 | A-19 | 100 | — | — | 590 | A | B | A | B | B (Good) |
| Example 26 | A-20 | 100 | — | — | 640 | A | B | B | A | B (Good) |
| Example 27 | A-24 | 100 | — | — | 530 | A | B | A | B | B (Good) |
| Comparative Example 5 | A-12 | 100 | — | — | 40 | C | C | B | D | D (Poor) |
| Comparative Example 6 | A-12 | 100 | — | — | 2100 | C | C | B | C | D (Poor) |
| Comparative Example 7 | A-11 | 100 | — | — | 580 | C | D | B | C | D (Poor) |

The abbreviations in Table 1 are as follows:

TMU: tetramethylurea

TEU: tetraethylurea

DMPU: N,N'-dimethylpropyleneurea

DMI: 1,3-dimethyl-2-imidazolidinone

B-4: Example Compound B-4 (3-methoxy-N,N-dimethylpropanamide)

B-7: Example Compound B-7 (3-n-butoxy-N,N-dimethylpropanamide)

C-3: Example Compound C-3 (methyl 5-dimethylamino-2-methyl-5-oxo-pentanoate)

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An endless belt comprising a polyimide resin layer comprising:
   a polyimide resin containing two or more components derived from tetracarboxylic dianhydrides and/or two or more components derived from diamine compounds; and
   1,3-dimethyl-2-imidazolidinone in an amount of from about 50 ppm to about 2,000 ppm,
   wherein, when the polyimide resin contains the two or more components derived from tetracarboxylic dianhydrides, the two or more components derived from tetracarboxylic dianhydrides comprise a first dianhydride component derived from a first tetracarboxylic dianhydride and a second dianhydride component derived from a second tetracarboxylic dianhydride;
   wherein, when the polyimide resin contains the two or more components derived from diamine compounds, the two or more components derived from diamine compounds comprise a first diamine component derived from a first diamine compound and a second diamine component derived from a second diamine compound;
   the first tetracarboxylic dianhydride is different from the second tetracarboxylic dianhydride; and
   the first diamine compound is different from the second diamine compound.

2. The endless belt according to claim 1, wherein the polyimide resin layer further comprises conductive particles.

3. The endless belt according to claim 2, wherein the conductive particles are carbon black.

4. The endless belt according to claim 1, wherein the polyimide resin contains the two or more components derived from diamine compounds.

5. The endless belt according to claim 4, wherein the first diamine compound is 4,4'-diaminodiphenyl ether or p-phenylenediamine.

6. The endless belt according to claim 1, wherein the components derived from tetracarboxylic dianhydrides include at least a component derived from 3,3',4,4'-biphenyltetracarboxylic dianhydride.

7. The endless belt according to claim 1, wherein the 1,3-dimethyl-2-imidazolidinone is present in the polyimide resin layer in an amount of from about 70 ppm to about 1,500 ppm.

8. The endless belt according to claim 7, wherein the 1,3-dimethyl-2-imidazolidinone is present in the polyimide resin layer in an amount of from about 100 ppm to about 1,000 ppm.

9. An image-forming apparatus comprising the endless belt according to claim 1.

10. An endless belt unit comprising:
the endless belt according to claim 1; and
a plurality of rollers around which the endless belt is looped under tension.

11. The endless belt according to claim 1, wherein the polyimide resin contains the two or more components derived from diamine compounds,
the first diamine compound is 4,4'-diaminodiphenyl ether, and
the second diamine compound is p-phenylenediamine.

12. The endless belt according to claim 11, wherein a weight ratio of the first diamine compound to the second diamine compound is from 70/30 to 90/10.

13. The endless belt according to claim 11, wherein the components derived from tetracarboxylic dianhydrides include at least a component derived from 3,3',4,4'-biphenyltetracarboxylic dianhydride.

14. The endless belt according to claim 1, wherein the polyimide resin contains the two or more components derived from tetracarboxylic dianhydrides,
the first tetracarboxylic dianhydride is 3,3',4,4'-biphenyltetracarboxylic dianhydride, and
the second tetracarboxylic dianhydride is 4,4'-oxydiphthalic dianhydride.

15. The endless belt according to claim 1, wherein the polyimide resin contains the two or more components derived from diamine compounds,
the first diamine compound is 4,4'-diaminodiphenyl ether,
the second diamine compound is p-phenylenediamine,
the polyimide resin contains the two or more components derived from tetracarboxylic dianhydrides,
the first tetracarboxylic dianhydride is 3,3',4,4'-biphenyltetracarboxylic dianhydride, and
the second tetracarboxylic dianhydride is 4,4'-oxydiphthalic dianhydride.

16. The endless belt according to claim 15, wherein a weight ratio of the first diamine compound to the second diamine compound is from 70/30 to 90/10.

17. A polyimide resin molded product comprising a polyimide resin layer comprising:
a polyimide resin containing two or more components derived from tetracarboxylic dianhydrides and/or two or more components derived from diamine compounds; and
1,3-dimethyl-2-imidazolidinone in an amount of from about 50 ppm to about 2,000 ppm,
wherein, when the polyimide resin contains the two or more components derived from tetracarboxylic dianhydrides, the two or more components derived from tetracarboxylic dianhydrides comprise a first dianhydride component derived from a first tetracarboxylic dianhydride and a second dianhydride component derived from a second tetracarboxylic dianhydride;
wherein, when the polyimide resin contains the two or more components derived from tetracarboxylic diamine compounds, the two or more components derived from diamine compounds comprise a first diamine component derived from a first diamine compound and a second diamine component derived from a second diamine compound;
the first tetracarboxylic dianhydride is different from the second tetracarboxylic dianhydride; and
the first diamine compound is different from the second diamine compound.

18. An endless belt comprising a polyimide resin layer comprising:
a polyimide resin containing two or more components derived from tetracarboxylic dianhydrides and/or two or more components derived from diamine compounds; and
tetramethylurea in an amount of from about 380 ppm to about 680 ppm,
wherein, when the polyimide resin contains the two or more components derived from tetracarboxylic dianhydrides, the two or more components derived from tetracarboxylic dianhydrides comprise a first dianhydride component derived from a first tetracarboxylic dianhydride and a second dianhydride component derived from a second tetracarboxylic dianhydride;
wherein, when the polyimide resin contains the two or more components derived from diamine compounds, the two or more components derived from diamine compounds comprise a first diamine component derived from a first diamine compound and a second diamine component derived from a second diamine compound;
the first tetracarboxylic dianhydride is different from the second tetracarboxylic dianhydride; and
the first diamine compound is different from the second diamine compound.

* * * * *